(12) United States Patent
Holst et al.

(10) Patent No.: US 8,270,399 B2
(45) Date of Patent: Sep. 18, 2012

(54) CROSSBAR APPARATUS FOR A FORWARDING TABLE MEMORY IN A ROUTER

(75) Inventors: John C. Holst, San Jose, CA (US); William L. Lynch, La Honda, CA (US)

(73) Assignee: Cisco Technology, Inc., San Jose, CA (US)

( * ) Notice: Subject to any disclaimer, the term of this patent is extended or adjusted under 35 U.S.C. 154(b) by 373 days.

(21) Appl. No.: 12/260,841

(22) Filed: Oct. 29, 2008

(65) Prior Publication Data

US 2009/0063702 A1 Mar. 5, 2009

Related U.S. Application Data

(63) Continuation of application No. 10/418,634, filed on Apr. 17, 2003, now Pat. No. 7,450,438, which is a continuation-in-part of application No. 10/177,496, filed on Jun. 20, 2002, now Pat. No. 7,382,787.

(51) Int. Cl.
*H04L 12/50* (2006.01)
(52) U.S. Cl. ........ 370/386; 370/351; 370/357; 370/389; 370/394; 711/124
(58) Field of Classification Search .................. 370/351, 370/357, 386, 389, 394; 711/124
See application file for complete search history.

(56) References Cited

U.S. PATENT DOCUMENTS

| | | |
|---|---|---|
| 4,885,744 A | 12/1989 | Lespagnol et al. |
| 5,014,262 A | 5/1991 | Harshavardhana |
| 5,140,417 A | 8/1992 | Tanaka et al. |
| 5,412,646 A | 5/1995 | Cyr et al. |
| 5,471,592 A | 11/1995 | Gove et al. |
| 5,524,258 A * | 6/1996 | Corby et al. .................... 712/19 |
| 5,677,851 A | 10/1997 | Kingdon et al. |
| 5,734,649 A | 3/1998 | Carvey et al. |
| 5,781,772 A | 7/1998 | Wilkinson, III et al. |
| 5,802,278 A | 9/1998 | Isfeld et al. |
| 5,838,894 A | 11/1998 | Horst |
| 5,878,415 A | 3/1999 | Olds |
| 5,905,725 A | 5/1999 | Sindhu et al. |
| 5,909,440 A | 6/1999 | Ferguson et al. |
| 5,920,699 A | 7/1999 | Bare |
| 5,923,643 A | 7/1999 | Higgins et al. |
| 5,930,256 A | 7/1999 | Greene et al. |

(Continued)

OTHER PUBLICATIONS

U.S. Appl. No. 10/418,634, Non-Final Office Action mailed Sep. 14, 2007, 11 pgs.

(Continued)

*Primary Examiner* — Hassan Phillips
*Assistant Examiner* — Gautam Sharma
(74) *Attorney, Agent, or Firm* — Schwegman, Lundberg & Woessner, P.A.

(57) ABSTRACT

A router including a lookup execution unit including a plurality of stages, a forwarding table memory arranged in hierarchy including addressable sectors, blocks, and entries, and a crossbar having an address crossbar for selectively coupling one of the plurality of stages to a sector of the memory so that data from the sector can be read. In one example, any one of the stages of the plurality of stages may be selectively and dynamically coupled with any one of the sectors of the forwarding table memory for providing an address to a particular sector of the memory to read data therefrom.

23 Claims, 15 Drawing Sheets

U.S. PATENT DOCUMENTS

| | | | |
|---|---|---|---|
| 6,011,795 A | 1/2000 | Varghese et al. | |
| 6,018,524 A | 1/2000 | Turner et al. | |
| 6,078,963 A | 6/2000 | Civaniar et al. | |
| 6,091,725 A | 7/2000 | Cheriton et al. | |
| 6,097,721 A | 8/2000 | Goody | |
| 6,101,192 A | 8/2000 | Wakeland | |
| 6,161,139 A | 12/2000 | Win et al. | |
| 6,192,405 B1 | 2/2001 | Bunnell | |
| 6,308,219 B1 | 10/2001 | Hughes | |
| 6,430,181 B1 | 8/2002 | Tuckey | |
| 6,434,148 B1 | 8/2002 | Park et al. | |
| 6,453,413 B1 | 9/2002 | Chen et al. | |
| 6,526,055 B1 | 2/2003 | Perlman et al. | |
| 6,584,528 B1* | 6/2003 | Kurafuji et al. | 710/240 |
| 6,631,419 B1 | 10/2003 | Greene | |
| 6,636,895 B1 | 10/2003 | Li et al. | |
| 6,658,002 B1 | 12/2003 | Ross et al. | |
| 6,675,187 B1 | 1/2004 | Greenberger | |
| 6,687,781 B2 | 2/2004 | Wynne et al. | |
| 6,697,875 B1 | 2/2004 | Wilson | |
| 6,721,316 B1 | 4/2004 | Epps et al. | |
| 6,731,633 B1 | 5/2004 | Sohor et al. | |
| 6,732,203 B2 | 5/2004 | Kanapathippillai et al. | |
| 6,751,191 B1 | 6/2004 | Kanekar et al. | |
| 6,778,490 B1 | 8/2004 | Achilles et al. | |
| 6,785,728 B1 | 8/2004 | Schneider et al. | |
| 6,795,886 B1 | 9/2004 | Nguyen | |
| 6,801,950 B1 | 10/2004 | O'Keeffe et al. | |
| 6,804,815 B1 | 10/2004 | Kerr et al. | |
| 6,879,559 B1 | 4/2005 | Blackmon et al. | |
| 6,920,456 B2 | 7/2005 | Lee et al. | |
| 6,922,724 B1 | 7/2005 | Freeman et al. | |
| 6,934,281 B2 | 8/2005 | Kanehara | |
| 6,941,487 B1 | 9/2005 | Balakrishnan et al. | |
| 6,944,183 B1 | 9/2005 | Iyer et al. | |
| 6,944,860 B2 | 9/2005 | Schmidt | |
| 6,954,220 B1 | 10/2005 | Bowman-Amuah | |
| 6,954,436 B1 | 10/2005 | Yip et al. | |
| 6,961,783 B1 | 11/2005 | Cook et al. | |
| 6,965,615 B1 | 11/2005 | Kerr et al. | |
| 6,973,488 B1 | 12/2005 | Yavatkar et al. | |
| 6,990,527 B2 | 1/2006 | Spicer et al. | |
| 7,006,431 B1 | 2/2006 | Kanekar et al. | |
| 7,020,718 B2 | 3/2006 | Brawn et al. | |
| 7,024,693 B2 | 4/2006 | Byrne | |
| 7,028,098 B2 | 4/2006 | Mate et al. | |
| 7,043,494 B1 | 5/2006 | Joshi et al. | |
| 7,051,039 B1 | 5/2006 | Murthy et al. | |
| 7,051,078 B1 | 5/2006 | Cheriton | |
| 7,054,315 B2 | 5/2006 | Liao | |
| 7,054,944 B2 | 5/2006 | Tang et al. | |
| 7,069,372 B1 | 6/2006 | Leung, Jr. et al. | |
| 7,069,536 B2 | 6/2006 | Yaung | |
| 7,073,196 B1 | 7/2006 | Dowd et al. | |
| 7,095,713 B2 | 8/2006 | Willhite et al. | |
| 7,096,499 B2 | 8/2006 | Munson | |
| 7,099,341 B2* | 8/2006 | Lingafelt et al. | 370/401 |
| 7,103,708 B2 | 9/2006 | Eatherton et al. | |
| 7,111,071 B1* | 9/2006 | Hooper | 709/238 |
| 7,124,203 B2 | 10/2006 | Joshi et al. | |
| 7,136,383 B1 | 11/2006 | Wilson | |
| 7,139,238 B2 | 11/2006 | Hwang | |
| 7,150,015 B2 | 12/2006 | Pace et al. | |
| 7,155,518 B2 | 12/2006 | Forslow | |
| 7,159,125 B2 | 1/2007 | Beadles et al. | |
| 7,167,918 B2 | 1/2007 | Byrne et al. | |
| 7,184,440 B1* | 2/2007 | Sterne et al. | 370/395.52 |
| 7,185,192 B1 | 2/2007 | Kahn | |
| 7,185,365 B2 | 2/2007 | Tang et al. | |
| 7,200,144 B2 | 4/2007 | Terrell et al. | |
| 7,200,865 B1 | 4/2007 | Roscoe et al. | |
| 7,203,171 B2 | 4/2007 | Wright | |
| 7,225,204 B2 | 5/2007 | Manley et al. | |
| 7,225,256 B2 | 5/2007 | Villavicencio | |
| 7,225,263 B1 | 5/2007 | Clymer et al. | |
| 7,227,842 B1* | 6/2007 | Ji et al. | 370/235 |
| 7,230,912 B1* | 6/2007 | Ghosh et al. | 370/216 |
| 7,231,661 B1 | 6/2007 | Villavicencio et al. | |
| 7,239,639 B2 | 7/2007 | Cox et al. | |
| 7,249,374 B1 | 7/2007 | Lear et al. | |
| 7,257,815 B2 | 8/2007 | Gbadegesin et al. | |
| 7,274,702 B2 | 9/2007 | Toutant et al. | |
| 7,274,703 B2 | 9/2007 | Weyman et al. | |
| 7,280,975 B1 | 10/2007 | Donner | |
| 7,289,517 B1 | 10/2007 | Shimonishi | |
| 7,302,701 B2 | 11/2007 | Henry | |
| 7,355,970 B2 | 4/2008 | Lor | |
| 7,382,787 B1 | 6/2008 | Barnes et al. | |
| 7,403,474 B2 | 7/2008 | Rorie | |
| 7,406,038 B1 | 7/2008 | Oelke et al. | |
| 7,418,536 B2 | 8/2008 | Leung, Jr. et al. | |
| 7,525,904 B1 | 4/2009 | Li et al. | |
| 7,536,476 B1 | 5/2009 | Alleyne | |
| 7,710,991 B1 | 5/2010 | Li et al. | |
| 7,889,712 B2 | 2/2011 | Talur et al. | |
| 2002/0002650 A1* | 1/2002 | Christenson | 711/5 |
| 2002/0009095 A1* | 1/2002 | Van Doren et al. | 370/432 |
| 2002/0035639 A1 | 3/2002 | Xu | |
| 2002/0124145 A1* | 9/2002 | Arimilli et al. | 711/146 |
| 2003/0005178 A1 | 1/2003 | Hemsath | |
| 2003/0046507 A1* | 3/2003 | Swanson | 711/170 |
| 2003/0056001 A1 | 3/2003 | Mate et al. | |
| 2003/0056134 A1* | 3/2003 | Kanapathippillai et al. | 713/324 |
| 2003/0091043 A1* | 5/2003 | Mehrotra et al. | 370/389 |
| 2003/0108056 A1 | 6/2003 | Sindhu et al. | |
| 2003/0120888 A1* | 6/2003 | Huang | 711/200 |
| 2003/0163589 A1* | 8/2003 | Bunce et al. | 709/250 |
| 2003/0188192 A1 | 10/2003 | Tang et al. | |
| 2003/0206528 A1* | 11/2003 | Lingafelt et al. | 370/238 |
| 2003/0208597 A1 | 11/2003 | Belgaied | |
| 2003/0212806 A1 | 11/2003 | Mowers et al. | |
| 2003/0212900 A1 | 11/2003 | Liu et al. | |
| 2004/0024888 A1 | 2/2004 | Davis et al. | |
| 2004/0139179 A1 | 7/2004 | Beyda | |
| 2006/0117126 A1 | 6/2006 | Leung et al. | |
| 2006/0159034 A1 | 7/2006 | Talur et al. | |

OTHER PUBLICATIONS

U.S. Appl. No. 10/418,634, Response filed Jan. 14, 2008 to Non-Final Office Action mailed Sep. 14, 2007, 7 pgs.

U.S. Appl. No. 10/418,634, Response filed Jun. 13, 2007 to Restriction Requirement mailed May 30, 2007, 5 pgs.

U.S. Appl. No. 10/418,634, Restriction Requirement mailed May 30, 2007, 7 pgs.

U.S. Appl. No. 10/418,634, Notice of Allowance mailed Apr. 21, 2008, 11 pgs.

U.S. Appl. No. 10/418,634, Notice of Allowance mailed Oct. 2, 2008, 11 pgs.

"What's Inside a Router?", http://www-net.cs.umass.edu/kurose/network/inside/inside.htm, (observed Aug. 29, 2005), 11 pgs.

"Xelerated Packet Devices", *MicroDesign Resources Presentation, Network Processor Forum*, (Jun. 14, 2001), 11 pgs.

Ballardie, A., "Core Based Trees (CBT) Multicast Routing Architecture", *RFC 2201*, (Sep. 1997), pp. 1-15.

Belenkiy, A., "Deterministic IP Table Lookup at Wire Speed", *The Internet Global Summit (INET '99)*, http://www.isoc.org/inet99/proceedings/4j/4j_2.htm, (observed May 12, 2003), 18 pgs.

Cataldo, A., "Net Processor Startup Takes Pipelined Path to 40 Gbits/s", EETimes.com, (Jul. 2, 2001), 2 pgs.

Chiueh, T.-C., et al., "High-Performance IP Routing Table Lookup Using CPU Caching", *Proceedings, Eighteenth Annual Joint Conference of the IEEE Computer and Communication Societies (INFOCOM '99)*, vol. 3, (1999), pp. 1421-1428.

Czerwinski, S E, et al., "An Architecture for a Secure Service", *5 th Annual ACM/IEEE International Conference on Mobile Computing and Networking*, (1999), pp. 24-35.

Degermark, M., et al., "Small Forwarding Tables for Fast Routing Lookups", *Proceedings, ACM SIGCOMM '97*, (1997), 3-14.

Finseth, C., "An Access Control Protocol, Sometimes Called TACACS", *RFC 1492*, (Jul. 1993), pp. 1-21.

Ganti, V., et al., "Mining Very Large Databases", *Computer*, vol. 32, Issue 8, (Aug. 8, 1999), pp. 38-45.

Gladney, H. M, "Access Control for Large Collections", *ACM Transactions on Information Systems(TOIS)*, vol. 15, Issue 2, (Apr. 1997), pp. 154-194.

Gong, L., et al., "A Secure Identity-Based Capability System", *IEEE Symposium on Security and Privacy*, (May 1-3, 1989), pp. 56-63.

Gupta, P, et al., "Packet Classification Using Hierarchical Intelligent Cuttings", *IEEE Micro*, (2000), pp. 1-9.

Gupta, P., et al., "Classifying Packets With Hierarchical Intelligent Cuttings", *IEEE Micro*, 21(1), (Jan./Feb. 2000), pp. 34-41.

Gupta, P., et al., "Packet Classification on Multiple Fields", *Proceedings of the Conference on Applications, Technologies, Architectures, and Protocols for Computer Communication (ACM SIGCOMM '99)*, (1999), pp. 147-160.

Gupta, P., et al., "Routing Lookups in Hardware at Memory Access Speeds", *Proceedings, Seventeen Annual Joint Conference of the IEEE Computer and Communications Societies (INFOCOM '98)*, vol. 3, (1998), pp. 1240-1247.

Kille, S., "Representing the O/R Address Heirarchy in the X.500 Directory Information Tree", *RFC 2294*, (Mar. 1998), pp. 1-13.

Kim, T., et al., "Role-Based Decomposition for Improving Concurrency in Distributed Object-Oriented Software Development Environments", *23rd Annual International Computer Software and Applications Conference (COMPSAC)*, (Oct. 29, 1999), pp. 410-415.

Kung, H. T., et al., "Algorithms for VLSI Processor Arrays", *In: Introduction to VLSI Systems*, Mead, C., et al., (eds.), Addison-Wesley, Reading, MA, (1980), pp. 271-292.

Lakshman, T. V., et al., "High-Speed Policy-Based Packet Forwarding Using Efficient Multi-Dimensional Range Matching", *Proceedings of the Conference on Applications, Technologies, Architectures, and Protocols for Computer Communications (ACM SIGCOMM '98)*, (1998), pp. 203-214.

Lampson, B., et al., "IP Lookups Using Multiway and Multicolumn Search", *IEEE/ACM Transactions on Networking*, 7(3), (Jun. 1999), pp. 324-334.

Lindberg, K., "Multi-Gigabit Routers", *Proceedings, HUT Internetworking Seminar*, http://www.tml.hut.fi/Opinnot/Tik-110.551/1998/papers/02MultiGigabitRouter/paper.html, (observed May 12, 1998), 14 pgs.

McAuley, A. J., et al., "Fast Routing Table Lookup Using CAMs", *Proceedings, Twelfth Annual Joint Conference of the IEEE Computer and Communications Societies, Networking: Foundation for the Future (INFOCOM '93)*, vol. 3, (1993), pp. 1382-1391.

Myers, J., "IMAP4 ACL Extension", *RFC 2086*, (Jan. 1997), pp. 1-8.

Partridge, C., et al., "A 50-Gb/s IP Router", *IEEE/ACM Transactions on Networking*, 6(3), (Jun. 1998), pp. 237-248.

Qui, L., et al., "Fast Firewall Implementations for Software and Hardware-Based Routers", *Microsoft Technical Report MSR-TR-2001-61*, (Jun. 2001), 18 pgs.

Saltzer, Jerome H., "Protection and the Control of Information Sharing in Multics", *Communications of the ACM*, vol. 17, Issue 7, (Jul. 1974), pp. 388-402.

Srinivasan, V., et al., "Fast and Scalable Layer Four Switching", *Proceedings of the Conference on Applications, Technologies, Architectures, and Protocols for Computer Communications (ACM SIGCOMM '98)*, (1998), pp. 191-202.

Srinivasan, V., et al., "Packet Classification Using Tuple Space Search", *Proceedings of the Conference on Applications, Technologies, Architectures, and Protocols (ACM SIGCOMM '99)*, (1999), pp. 135-146.

Stokes, E., et al., "Access Control Requirements for LDAP", *RFC 2820*, (May 2000), pp. 1-9.

Waldvogel, M., et al., "Scalable High Speed IP Routing Lookups", *Proceeding, ACM SIGCOMM '97*, (1997), pp. 25-36.

Wijnen, B., et al., "View-Based Access Control Model (VACM) for the Simple Network Management Protocol (SNMP)", *RFC 2575*, (Apr. 1999), pp. 1-38.

\* cited by examiner

CROSSBAR APPARATUS FOR A FORWARDING TABLE MEMORY IN A ROUTER

CROSS-REFERENCE TO RELATED APPLICATION APPLICATIONS

This application is a continuation of commonly assigned patent application entitled "CROSSBAR APPARATUS FOR A FORWARDING TABLE MEMORY IN A ROUTER", filed on Apr. 17, 2003, application Ser. No. 10/418, 634, now U.S. Pat. No. 7,450,438, issued on Nov. 11, 2008, which is a continuation-in-part of the commonly assigned patent application entitled "PACKET ROUTING AND SWITCHING DEVICE," filed on Jun. 20, 2002, application Ser. No. 10/177,496, now U.S. Pat. No. 7,382,787, issued on Jun. 3, 2008, the disclosures which are hereby incorporated by reference in their entirety.

TECHNICAL FIELD

This application relates, in general, to routers, and more particularly to a crossbar apparatus for permitting read and write accesses to a forwarding table memory used within a router.

BACKGROUND

Packet switched networks, such as the Internet, divide a message or a data stream transmitted by a source into discrete packets prior to transmission. Upon receipt of the packets by the recipient, the packets are recompiled to form the original message or data stream. As a packet-switched network, the Internet is comprised of various physical connections between computing devices, servers, routers, sub-networks, and other devices which are distributed throughout the network.

Routers connect networks, and each router has multiple inputs and multiple outputs coupled to independent network devices such as servers or other routers, the connections being made through communications links such as optical fibers or copper wires or the like.

Routers receive the packets being sent over the network and determine the next hop or segment of the network to which each packet should be sent through one of the ports of the router. When the router passes the packet to the next destination in the network, the packet is one step closer to its final destination. Each packet includes header information indicating the final destination address of the packet.

Conventionally, routers include memories and microprocessors therein for processing the packets received by the routers, as well as for performing other functions required of the router. Typically, routers contain one or more processors, one or more forwarding engines, and a switch fabric. The route processor is a dedicated embedded subsystem which is responsible for communicating with the neighboring routers in the network to obtain current and ever-changing information about the network conditions. The route processor forms a routing table which is downloaded into and subsequently accessed for forwarding packets by the forwarding engine(s).

The forwarding engine of the router is responsible for determining the destination address and output port within the router to which to direct the received packet, this determination conventionally being made by accessing a routing table containing routing information for the entire network and performing a look-up operation.

One example of a conventional forwarding engine for a router is shown in FIG. 1, wherein a plurality of general purpose CPUs 20 are provided in the architecture for the forwarding engine 22. Each CPU is a separate integrated circuit and receives packet data, and each CPU processes individual packets by performing a forwarding or lookup operation using an external SRAM 24 having a forwarding lookup table stored therein. As packets are received from the network, they are stored in a very large input buffer 26 on the front end of the forwarding engine for temporary storage until a CPU can remove a packet from the buffer and perform the forwarding/lookup operation. Such a system is commonly referred to as being "input striped," wherein the packets are written into the input buffer sequentially as they are received, but maybe processed in a non-sequential order as the CPUs become available for processing.

Conventionally, determining the destination port within the router to which to send the received packet is a computationally intensive process, particularly in view of the high data rates of the network (known as the "line rate"), such as 10 Giga bits/second. At this line rate, a forwarding engine within a router must make the destination port determination for approximately 30 million minimum sized IP packets per second per port. Accordingly, as the router receives multiple packets, a conventional forwarding engine utilizes the large buffer memory 26 on its front end, as shown in FIG. 1, to temporarily store a number of packets until the path is determined of the packet presently being processed by the forwarding engine.

As such, conventional forwarding engines for routers can be susceptible to performance degradation if the network traffic directed at the router is high, particularly when the router receives a plurality of packets having short lengths, thereby requiring that the look-up operations be performed quickly. Further, the increasing demand for IP-centric services over the Internet, such as voice over IP, streaming video, and data transfers to wireless devices with unique IP addresses, has increased the demand for data handling by the forwarding engines, as well as the size of the forwarding table.

Also, in such a conventional arrangement as shown in FIG. 1, the CPUs 20 each contend for access to the external forwarding table SRAM 24 to perform the lookup operation, which can be problematic in that contention for the external SRAM can provide a bottleneck which limits the system's performance. Conventional routers have a forwarding engine/ CPU with an off-chip forwarding table, typically implemented using DRAM and may be 30 Megabytes in size— which is a substantial memory size. Conventionally, it may take many cycles—such as 20 cycles—to look up an address for a packet.

As recognized by the present inventors, what is needed is a cross-bar apparatus or circuit for permitting access by various stages of a forwarding engine to the forwarding table memory so that look up operations can occur efficiently. It is against this background that various embodiments of the present invention were developed.

SUMMARY OF THE INVENTION

In light of the above and according to one broad aspect of one embodiment of the present invention, disclosed herein is a crossbar apparatus which permits different stages of a forwarding engine to access an on-chip forwarding table memory. In one embodiment, the crossbar utilizes shared, differential low swing buses to provide high bandwidth for read operations.

According to another broad aspect of another embodiment of the present invention, disclosed herein is a programmable crossbar for dynamically coupling a plurality of stages of an execution unit to one or more portions of a memory. In one embodiment, the crossbar may include a set of address lines coupled with each stage of the plurality of stages for receiving an address signal from at least one stage, and logic for selectively coupling one of the plurality of stages to a portion of the memory. In one example, the logic receives the set of address lines from each stage and compares a portion of the address signal to one or more hardwired addresses associated with each portion of the memory. The logic may also receive a plurality of programmable enable signals corresponding to each stage of the plurality of stages. In one embodiment, when the portion of the address signal from one stage of the plurality of stages matches one of the hardwired addresses associated with one portion of the memory, then the one stage of the plurality of stages is coupled with the one portion of memory if the programmable enable signal associated with the one stage is active. Hence, under programmatic control (via control of the enable line) a particular stage of the execution unit can have its address lines for a read operation dynamically and selectively coupled with a particular portion of the memory.

In one example, the set of address lines may be implemented as sets of differential, low swing pairs of signal lines, each pair corresponding to a single address bit. In this way, high speed addressing and memory accesses can take place. For improved noise immunity at high clock frequencies, the plurality of differential pairs of address lines may be interleaved along their length.

The logic may include a multiplexer for receiving the address signals from each of the stages and selecting the address signals associated with one stage of the stages based on a plurality of select lines, and a comparator for comparing a portion of the address signal from one stage of the plurality of stages to a hardwired addresses associated with one portion of the memory. The logic may also include a logic gate, such as an AND gate or other combinatorial logic device or element, receiving an output from the comparator and receiving a programmable enable signal associated with the one stage, the logic gate activating a select line associated with a stage based on the output from the comparator and a state of the programmable enable signal, thereby effecting the multiplexer to select the address signals of the one stage for connection with the memory.

In another example, the crossbar may also include a set of data lines from the memory and logic for dynamically coupling the set of data lines to one stage of the plurality of stages. In this way, data can be selectively delivered to particular stages of the execution unit under programmatic control. The data lines may include a plurality of differential pair data lines, each differential pair data line representing a single data bit, and the plurality of differential pair data lines may be interleaved along their length.

According to another broad aspect of another embodiment of the present invention, disclosed herein is a router including a lookup execution unit including a plurality of stages, a forwarding table memory arranged in hierarchy including addressable sectors, blocks, and entries, and a crossbar having an address crossbar for selectively coupling one of the plurality of stages to a sector of the memory so that data from the sector can be read. In one example, any one of the stages of the plurality of stages may be selectively and dynamically coupled with any one of the sectors of the forwarding table memory for providing an address to a particular sector of the memory to read data therefrom.

In one embodiment, the address crossbar is dynamically controllable to selectively couple stages of the lookup execution unit to different sectors of the forwarding table memory. The address crossbar may be formed from a plurality of differential signal pairs.

According to another broad aspect of the present invention, disclosed herein is a crossbar apparatus for permitting multiple portions of a forwarding engine to read from a forwarding table memory. In one embodiment, the crossbar apparatus includes a plurality of differential low swing bus signal lines coupled with the multiple portions of the forwarding engine to control a selection of a sector of the forwarding table memory, and a plurality of differential low swing bus signal lines coupled with the multiple portions of the forwarding engine to control a selection of a block of the forwarding table memory.

The features, utilities and advantages of various embodiments of the invention will be apparent from the following more particular description of embodiments of the invention as illustrated in the accompanying drawings.

DETAILED DESCRIPTION

According to one broad aspect of one embodiment of the present invention, disclosed herein is a crossbar apparatus which permits different stages of a forwarding engine to access an on-chip forwarding table memory. In one embodiment, the crossbar utilizes shared, differential low swing buses to provide high bandwidth for read operations. The forwarding engine may have stages or execution units which access the forwarding table memory through the crossbar. In order to reduce the number of cycles needed to performing a look-up operation, the forwarding table memory may include a portion on-chip with the forwarding engine and an external portion outside of the forwarding engine. Additionally, the forwarding engine performs a lookup operation by accessing the route information contained in the forwarding table. Various embodiments of the present invention will now be described.

Figure 1:
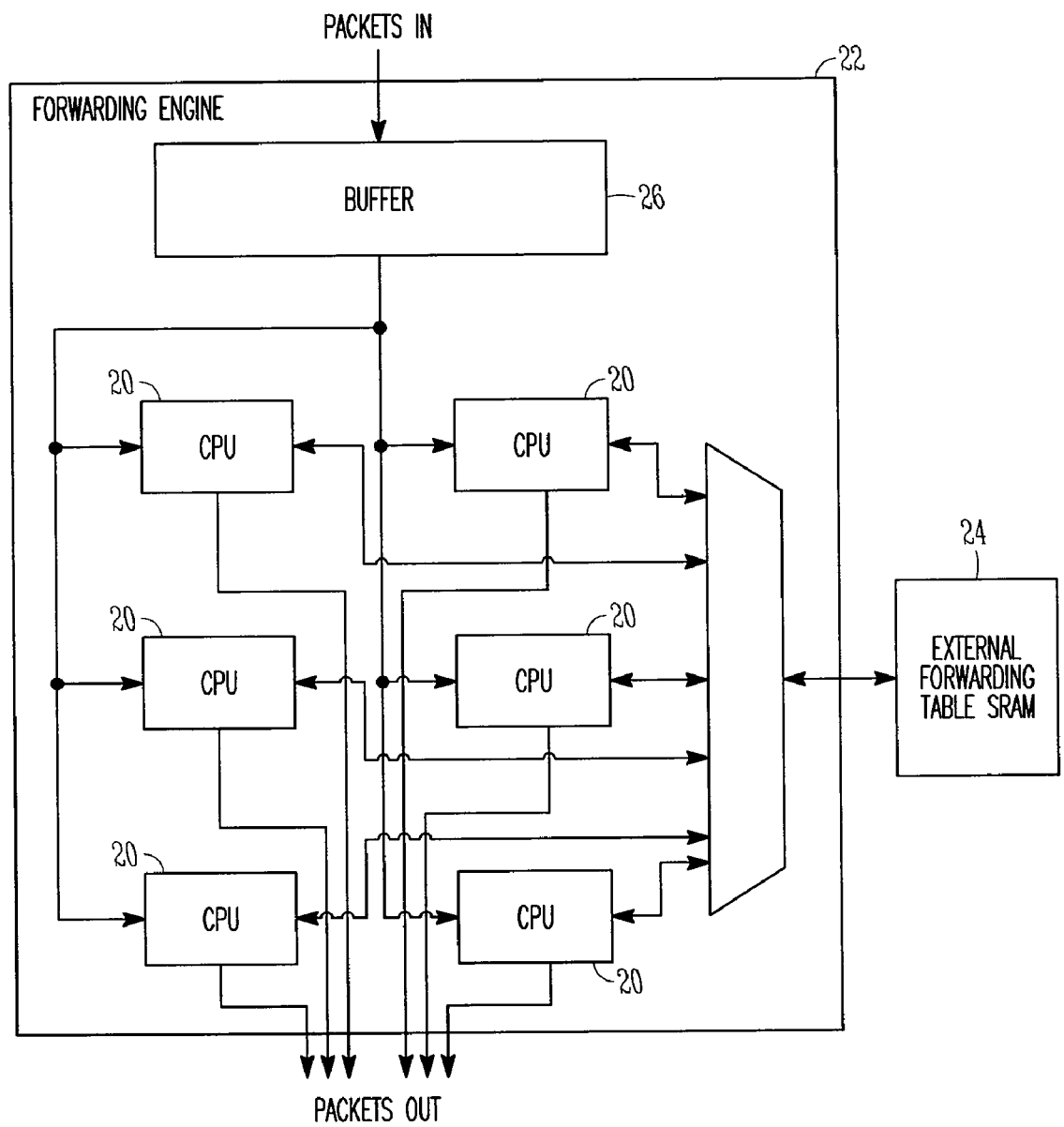
FIG. 1 illustrates a block diagram of a conventional microprocessor forwarding engine with an external forwarding table SRAM used in a conventional routing device.
Figure 2:
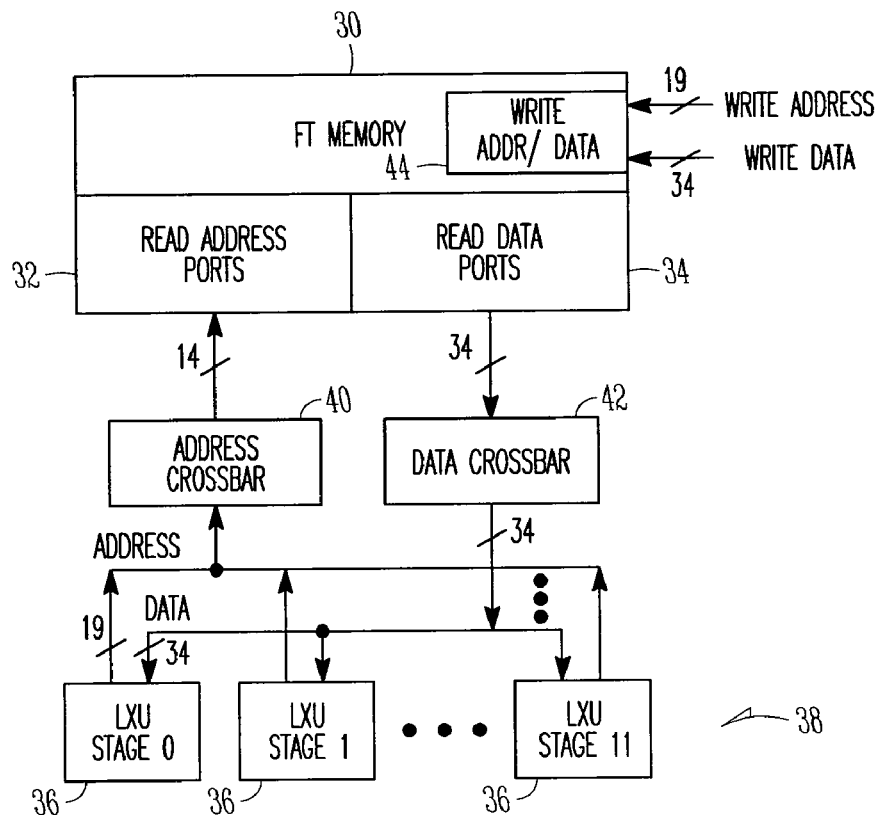
FIG. 2 illustrates an example of a forwarding table memory having an address crossbar and a data crossbar, in accordance with one embodiment of the present invention.

FIG. 2 illustrates an example of a forwarding table memory 30 having read ports 32, 34 (address and data) that are coupled with, on a selective basis, the various stages 36 of a lookup execution unit 38 through an address crossbar 40 and a data crossbar 42, in accordance with one embodiment of the present invention. The forwarding table memory 30 also has a write ports 44 for writing data to particular addresses in the memory 30. The address crossbar 40 permits any of the stages 36 to be selectively, dynamically, and programmatically coupled with various different portions of the memory 30. In this manner, the stages 36 can provide read addresses to particular selected portions of the memory.

In one example, the lookup execution unit 38 includes 12 stages, and each stage 36 is coupled with the data crossbar 42 and the address crossbar 40. In one example, each stage 36 is coupled with the data crossbar 42 through a 34 line bus, and each stage 36 is coupled with the address crossbar 40 through a 19 line bus with an enable signal. The address crossbar 40 selectively couples the address signal lines from a particular execution stage 36 to the read address ports 32 of the memory, so that a stage 36 of the execution unit can launch a request that data from a particular address of the forwarding table 30 be returned. The data crossbar 42 selectively couples the read data ports 34 of the memory to an execution unit stage 36, so that data returned from a read request can be provided to the appropriate execution unit stage 36.

Figure 9:
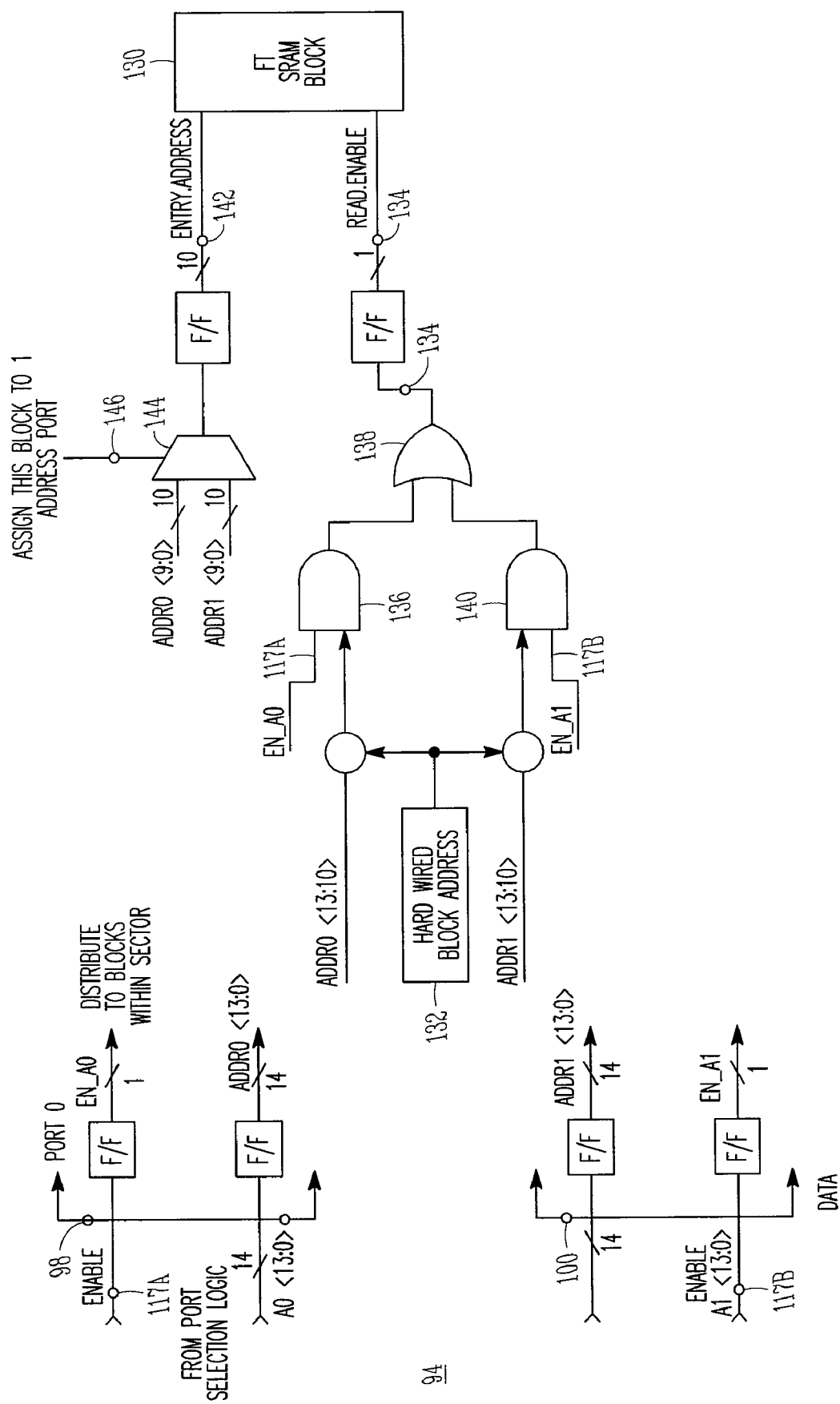
FIG. 9 illustrate various structures for decoding the block address and for providing the entry address to a particular selected block of memory, in accordance with one embodiment of the present invention.
Figure 10:
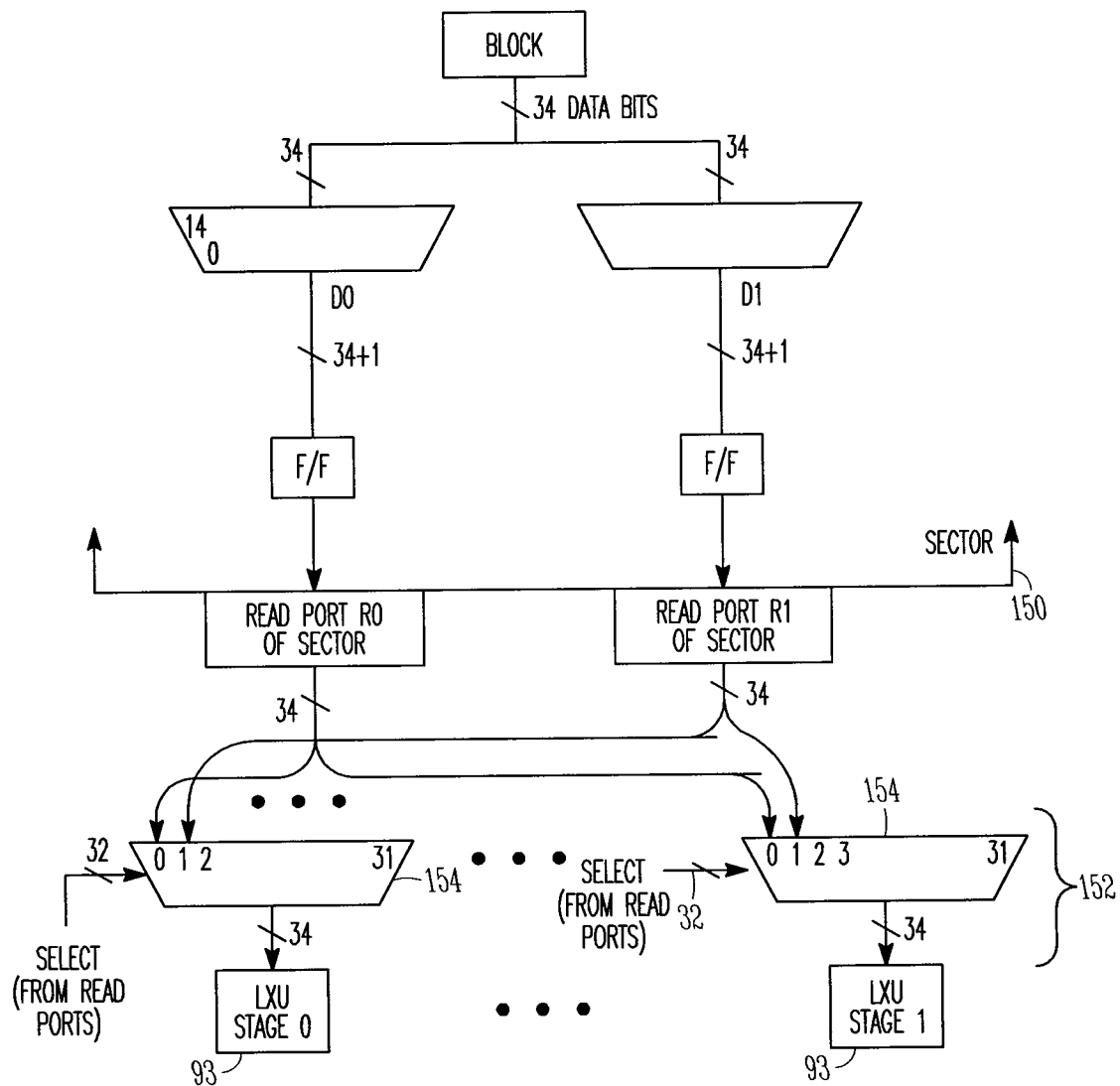
FIG. 10 illustrates a sector of a memory block having two data ports, shown as R0 and R1, each data port including 34 data bits representing the results of the read operation, in accordance with one embodiment of the present invention.

In one embodiment, the write ports 44 of the memory can be directly accessed through a 19 bit address bus and a 34 bit data bus, so that the forwarding table memory 30 can be populated with entries such as route information or other data used during lookup operations or forwarding operations in a router. FIGS. 3-9 relate to the address crossbar used during read operations; FIG. 10 relates to the data crossbar used during read operations; and FIG. 11 relates to writing data to the memory.

Figure 3:
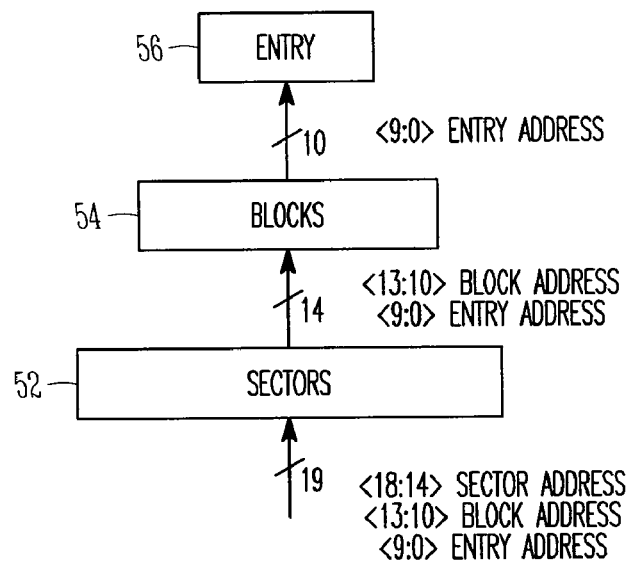
FIG. 3 illustrates a representation of a hierarchy which may be utilized within the general memory structure of FIG. 2, in accordance with one embodiment of the present invention.

FIG. 3 illustrates a representation of a hierarchy which may be utilized within the general memory structure of FIG. 2, in accordance with one embodiment of the present invention. As shown in FIG. 3, a hierarchical arrangement 50 of the memory may include sectors 52, blocks 54, and entries 56, each of which may be addressable. Due to the hierarchy 50 established in FIG. 3, entries 56 in the memory are addressed by their sector 52 and block 54. In one example, a 19 bit address can be used to address the memory, where 5 bits can be used to address the sector 52, 4 bits can be used to address the block 54, and 10 bits can be used to address the particular entry 56 in the memory. Accordingly, the circuit sections of memory which decode sectors information of the memory may receive 19 bits of address; the circuit sections of memory decoding the block information may receive 14 bits of the address; and the circuit sections of memory decoding of the entry selection may receive 10 bits of the address information, in one embodiment.

Figure 4:
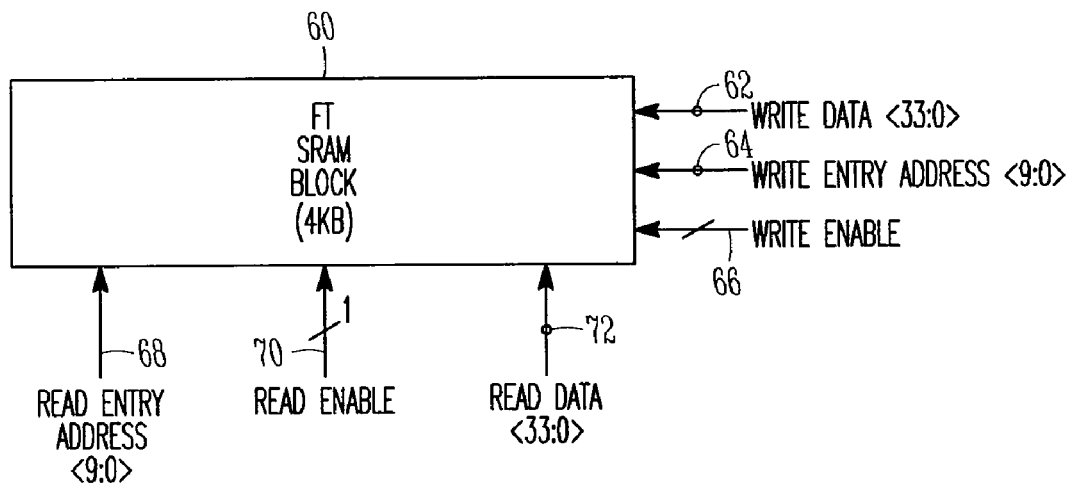
FIG. 4 illustrates a representation of a block of memory of a forwarding table memory, in accordance with an embodiment of the present invention.

FIG. 4 illustrates a representation of a block 60 of memory, in accordance with an embodiment of the present invention. In this example, the block 60 is a 4 kBytes in size, and has a write data port 62, a write address port 64, and a write enable line 66. The memory block 60 also has a read entry address port 68, a read enable line 70, and a read data output port 72. When the write enable signal 66 is asserted, the data present at the write data port 62 is written to the memory at the address specified by the write entry address 64. When the read enable signal is asserted, the memory provides, to the read data output port 72, the contents of the address specified by the read entry address 68.

Figure 5:
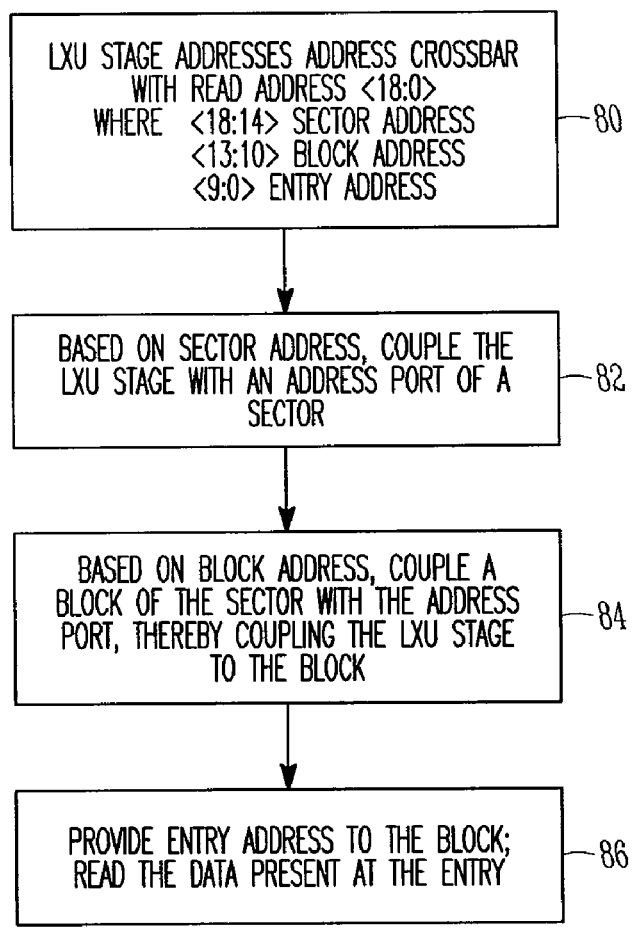
FIG. 5 illustrates an example of logical operations for a memory system, in accordance with an embodiment of the present invention.

FIG. 5 illustrates an example of logical operations of the memory system of FIG. 2, in accordance with an embodiment of the present invention. At operation 80 a stage of the execution unit provides to the memory an address on the address crossbar so that the contents of the memory at the specified address will be provided by the memory (i.e., the execution unit is initiating a read operation). In one example, the stage of the execution unit provides a 19 bit address to the address crossbar which specifies the sector address, the block address, and the entry address. At operation 82, based on the sector address, the address crossbar couples the stage of the execution unit with an address port of a particular sector of the memory. At operation 84, based on the block address specified by the stage of the execution unit, the address crossbar couples a block of the sector (specified by operation 82 with the address port, thereby coupling the stage of the execution unit with the block of memory. At operation 86 the entry address specified by the stage of the execution unit is provided to the appropriate block of memory, and the data or contents that are present at that particular entry are read and can be provided over the read data output port of the memory to a stage of the execution unit through the data crossbar, in one example.

Figure 6:
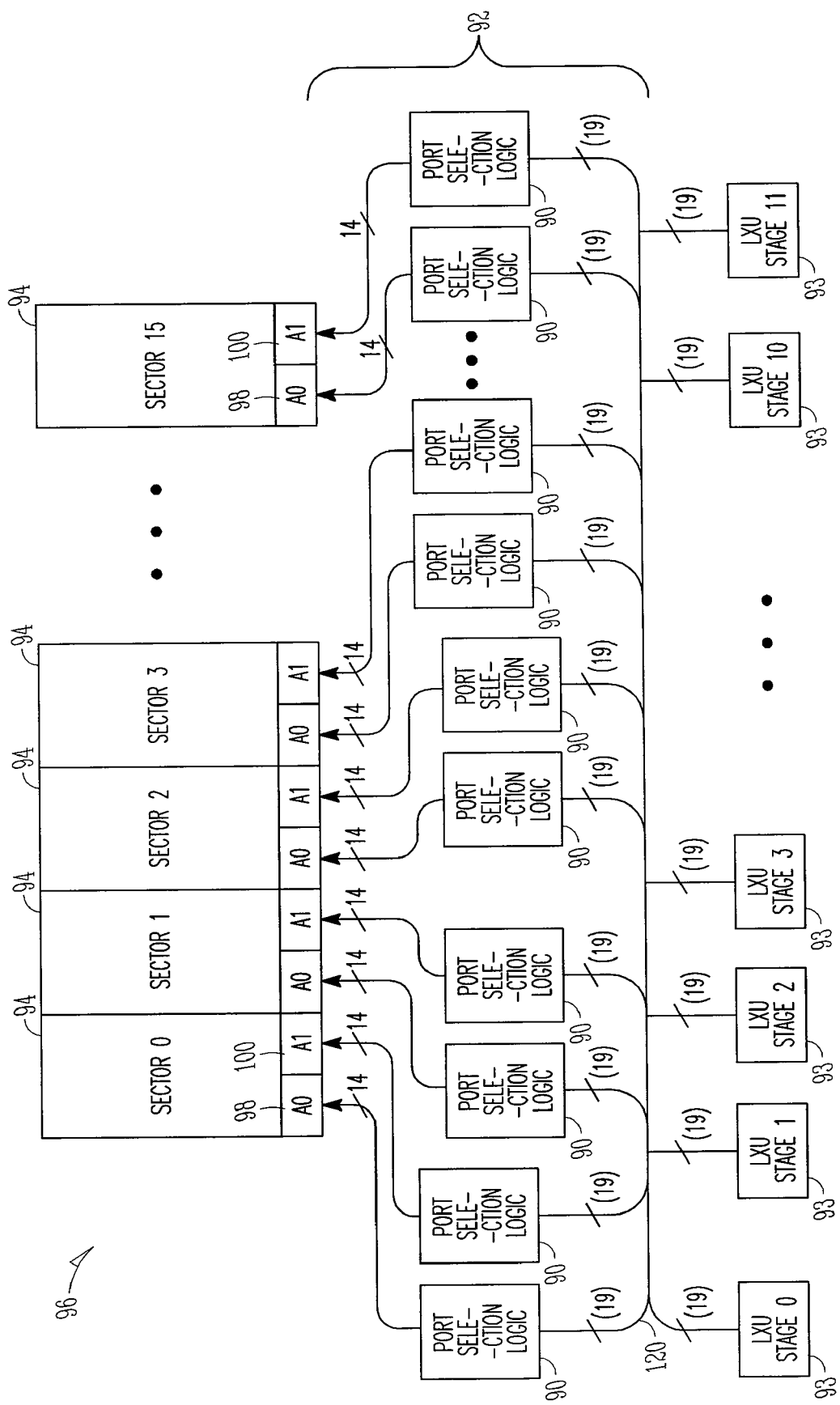
FIG. 6 illustrates a plurality of port selection logic blocks that may be used to form the address crossbar between the stages of the execution units and the sectors of the memory, in accordance with an embodiment of the present invention.

FIG. 6 illustrates a plurality of port selection logic blocks 90 that may be used to form the address crossbar 92 between the stages 93 of the execution units and the sectors 94 of the memory, in accordance with an embodiment of the present invention. In this example, the memory 96 is divided into 16 sectors 94, each sector 94 having two address read ports 98, 100. Each stage 93 of the execution unit is coupled with each port selection logic block 90 through a bus 102, and such that each stage 93 of the execution unit can address, through the crossbar 92, each port of each sector 94 of the memory 96.

Because there are two ports 98, 100 for each sector 94 in one example of the memory, each sector 94 can receive addresses from two different stages 93 of the execution unit, and the memory 96 can return data quickly depending on which port is active. Each of the read ports 98, 100 of a sector 94 can be reading data simultaneously from the sector so long as they do not simultaneously access the same block within the sector.

In one example, read ports 98, 100 are assigned to a single LXU pipeline stage 93 dynamically by external control, such as software. By using 2 read ports in each sector, a pipeline stage with need for a single 4 kB block can be shared with a pipeline stage that requires a large number of blocks, thereby improving the usage of memory.

Figure 7:
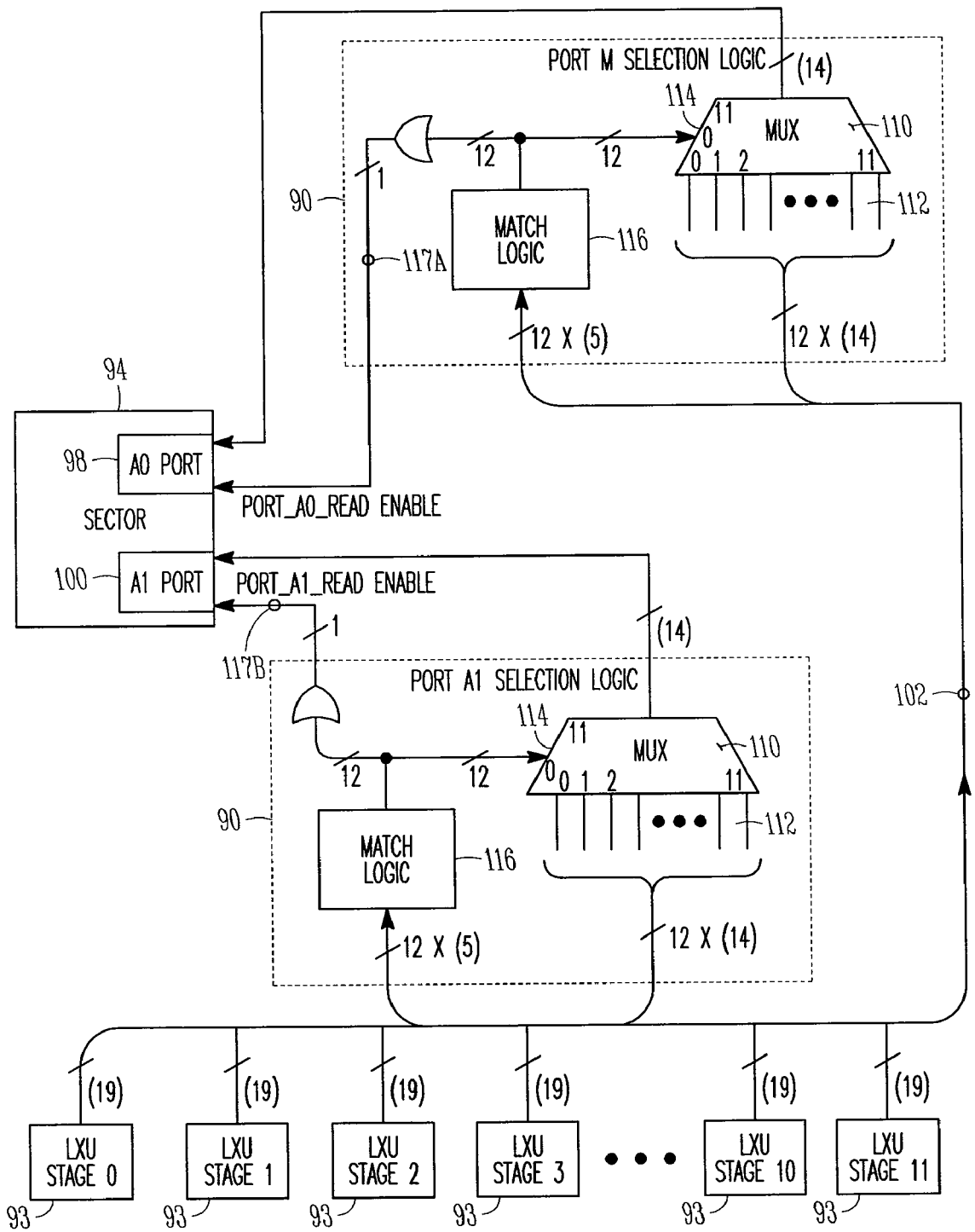
FIG. 7 illustrates an example of a sector of memory and the interconnections between the stages of the execution units and the port selection logic blocks of the address crossbar of FIG. 6, in accordance with an embodiment of the present invention.

FIG. 7 illustrates an example of a sector 94 of memory and the interconnections between the stages 93 of the execution units and the port selection logic blocks 90 of the address crossbar of FIG. 6, in accordance with an embodiment of the present invention. As shown in FIG. 7, a port selection logic block 90 may include a multiplexer 110 having a plurality of inputs 112 14 bits wide each, and 12 select lines 114 under the control of a match logic block 116 which can be under program control (see FIG. 8). In one example, only one select line 114 is active at any one time under the control of the match logic block 116. The match logic block 116 receives, as one of its inputs, 5 bits of address corresponding to the sector address received from each of the stages 93 of the execution units. The multiplexer 110 receives, as its inputs, 14 bits of the address from each of the stages 93 of the execution units, wherein these 14 bits of address represent the block address and the entry address. A Port_Read_Enable 117 signal is true when the match logic actuates a select line 114.

Although only one sector 94 of the memory is illustrated in FIG. 7, a similar arrangement as shown in FIG. 7 may be repeated for each of the sectors of the memory, so that each stage 93 of the execution unit can be coupled with any sector 94 of memory through a respective port selection logic 90. In this way, the port selection logic 90 of the address crossbar 92 can decode the sector portion specified in the address by the stages 93 of the execution units and pass along the remaining block address bits and entry address bits of the address to the memory for further decoding.

Figure 8:
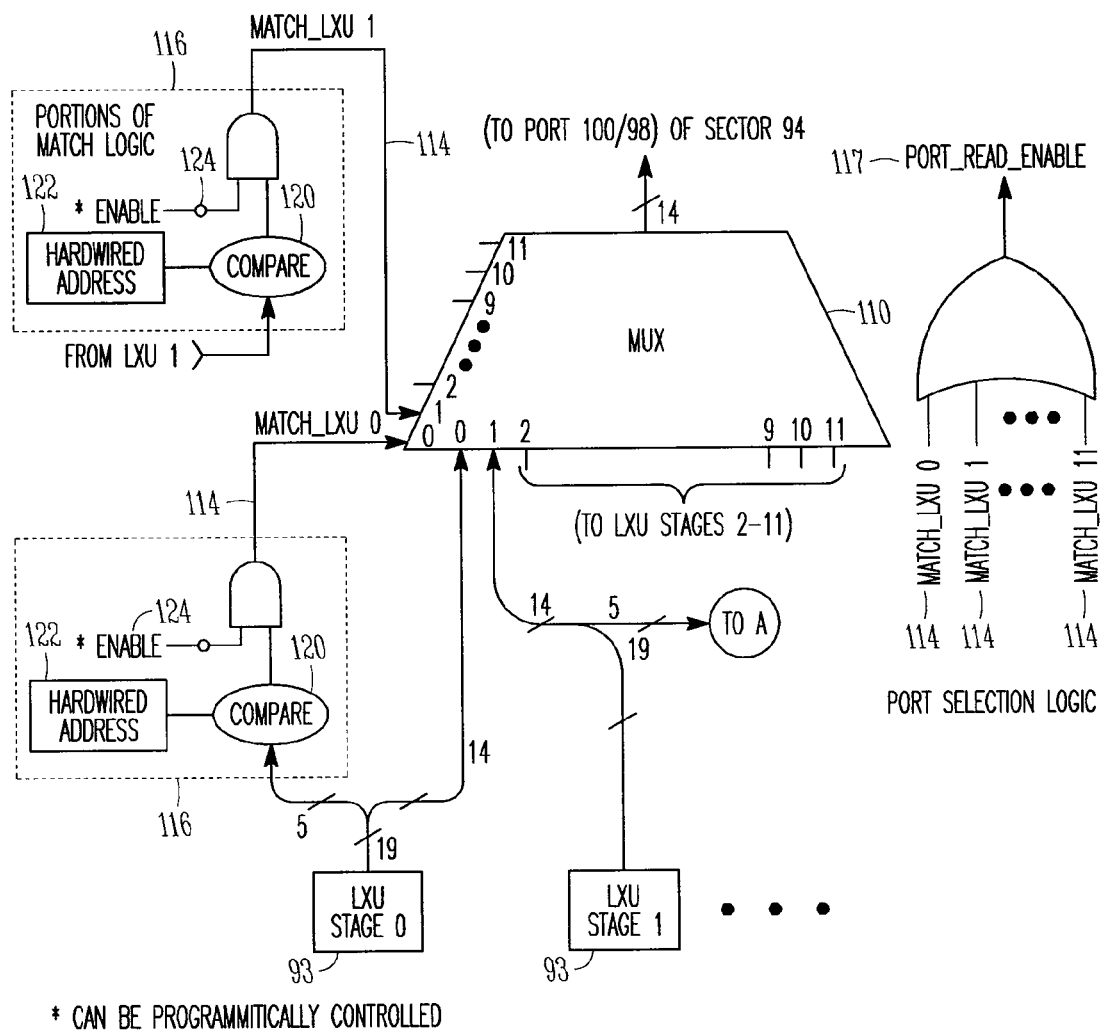
FIG. 8 illustrates an example of stages of the execution unit coupled with a multiplexer of a port selection logic block for a particular sector, in accordance with an embodiment of the present invention.

FIG. 8 illustrates an example of stages 93 of the execution unit coupled with a multiplexer 110 of a port selection logic block for a particular sector, in accordance with an embodiment of the present invention. As shown in FIG. 8, of the 19 bit address provided by a stage 93 of the execution unit, 14 bits are provided as an input to the multiplexer 110, while 5 bits of the address are provided to match logic 116 which is used to activate or deactivate a select line 114 of the multiplexer. The match logic shown in FIG. 8 includes a comparator 120 which compares the 5 bit sector address to a hardwired address 122, and if there is a match (and if an Enable signal 124 is active which may be dynamically controlled through, for instance, a software register), then the match logic 116 activates a select line 114 of the multiplexer 110 so that the multiplexer 110 couples the address lines of the particular stage 93 to the sector 94 of the memory.

As shown in FIG. 8, the multiplexer 110 for a particular port 98, 100 of a sector has, in one example, 12 input ports, wherein each ports is a 14 wire bus which is coupled with a stage 93 of the execution unit. In this manner, 14 bits of address from each stage 93 of the execution unit are connected as inputs into the multiplexer 110, and, based on a whether the match logic 116 activates one of the 12 select lines of the multiplexer, the particular 14 line address bus of a particular stage 93 of the execution unit can be selected and coupled with a sector 94 of the memory. The Enable signals 124 on the match logic 116 may be controlled, for example, by software, and only one of the twelve enable signals 124 is allowed to be true at a given time.

Assuming that the address lines of a particular stage 93 of an execution unit have been coupled with a particular port 98, 100 of a sector 94 based on the sector address and the Enable control 124, the block address is then decoded. FIG. 9 illustrates various structures for decoding the block address and for providing the entry address to a particular selected block of memory, in accordance with one embodiment of the present invention.

Referring to FIG. 9, a pair of ports 98, 100 of a sector 94 are illustrated, port A0 and port A1. Enable signals 117A, B are received by port A0, A1 and these signals are distributed to blocks 130 within this sector 94. The 14 line address bus selected by the port selection logic for A0, as well as the 14 line address bus selected by the port selection logic for A1, is received by the port of the sector and is used within the sector. In one example, the four bit block address from port A0 is compared to a hardwired block address 132, and if there is a match and the Enable signal 117A for port A0 is active, then a Read_Enable 134 signal goes active (through AND gate 136 and OR gate 138) to activate a read operation of the memory block 130. Likewise, the four bit block address from port A1 is compared to a hardwired block address 132, and if there is a match and the Enable signal B for port A1 is active, then a Read_Enable signal 134 goes active (through AND gate 140 and OR gate 138) to activate a read operation of the memory block 130.

The entry address 142 (10 bits in one example) from either the address from port A0 or port A1 is selected through a multiplexer 144 where the select line 146 is coupled with a control signal that determines whether the block should be assigned to port A0 or port A1; this control/selection 146 may be controlled by software, in one example. Accordingly, the memory block 130 is selectively provided with the entry address portion of the address supplied by a stage of the execution unit, along with a Read Enable signal 134. In response, the memory block 130 decodes the entry address 142 and provides the data/contents of the particular entry to the read data port of the memory so that the data can be read by a stage of the execution unit.

FIG. 10 illustrates a sector 150 of a memory block having two data ports, shown as R0 and R1, each data port including 34 data bits representing the results of the read operation. The data crossbar 152 links the output of each read port of a sector to each stage 93 of the execution unit so that a particular read port can be selectively coupled with a particular stage of the execution unit, thereby passing the results of the read operation to a particular stage. In one example, the data crossbar 152 includes a plurality of multiplexers 154, each multiplexer having 32 inputs wherein each input is 34 bits wide, a plurality of select lines, and an output coupled with a particular stage of the execution unit. In order to provide the data from a port of a sector to a stage, the select line of the multiplexer connected between the port of the sector and the stage is activated.

When a valid read operation (address plus a read enable, where the address corresponds to a block that is mapped to that read address port) is presented to a sector read address port, that sector knows that valid data will be driven out the corresponding read data port at a fixed time in the future (3 clock cycles later, in one example). Logically, each sector's read port drives its corresponding select signal based upon this information.

Accordingly, it can be seen from FIGS. 3-10, when a stage of an execution unit initiates a read operation of an address in memory, the sector and block information from the address are used to selectively provide, through the address crossbar, the address information to the appropriate memory block. Once the memory has received the address, the memory provides the data to its read data ports so that the data can be selectively provided to a particular stage of the execution unit through the data crossbar.

Figure 11:
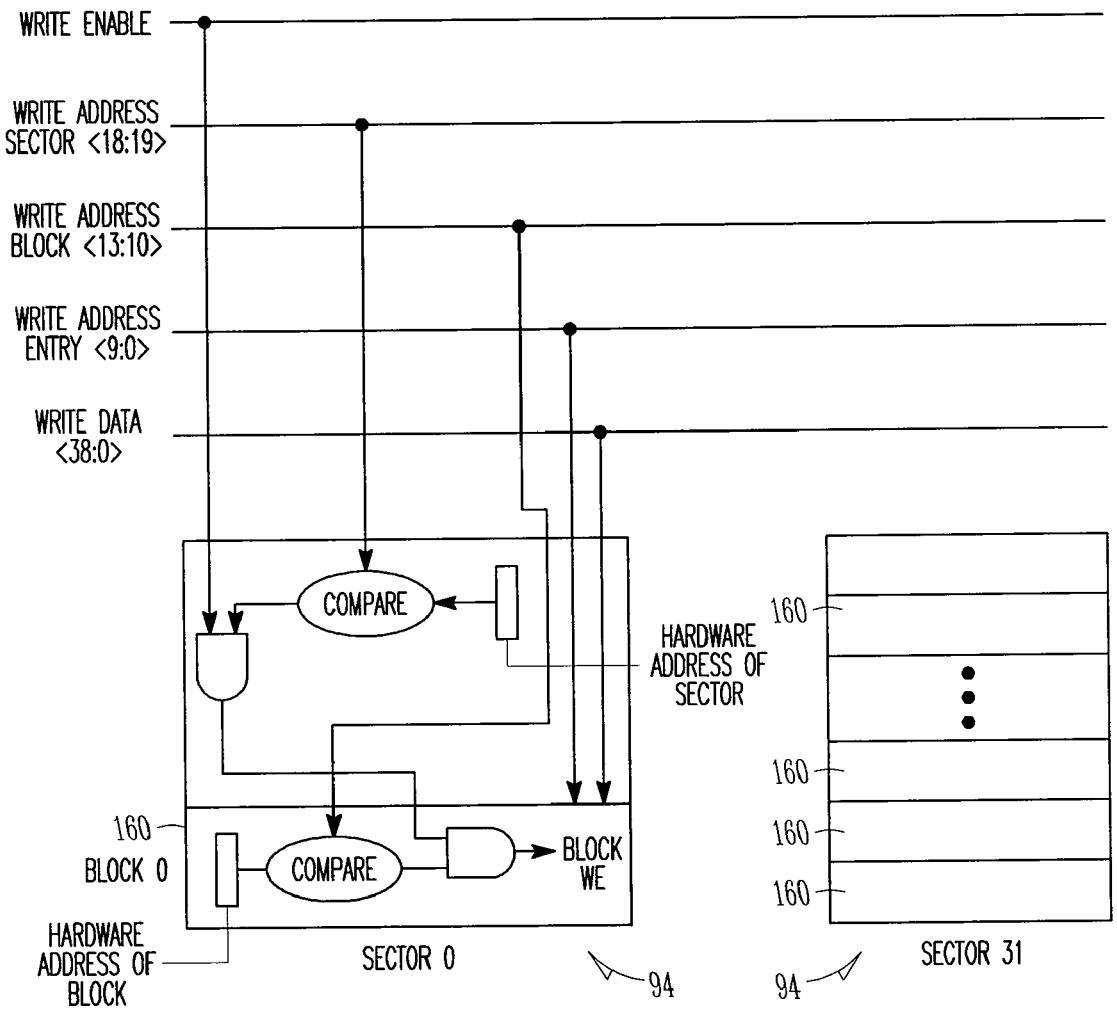
FIG. 11 illustrates a block diagram for writing data to selected blocks of memory, in accordance with an embodiment of the present invention.

FIG. 11 relates to writing data to selected blocks of memory, in accordance with an embodiment of the present invention. In this example, it is assumed that a single stage or a single unit is responsible for writing data to the memory, and therefore a crossbar or other mechanism is not used. In FIG. 11, a plurality of sectors 94 are shown, each sector has a plurality of blocks 160. Three signals are utilized in one example of writing data, including a Write Enable signal, a signal containing the address to be written to, and a signal containing the data to write. The address signal contains a sector address portion specifying the sector to which data should be written, a block of address portion specifying the block of the sector to which data should be written, and an entry address portion specifying the entry within the block of the sector to which data should be written.

As shown in FIG. 11, the sector address is compared to a hardwired address 162 of the sector, and if there is a match and if the Write Enable signal is active, the block address is compared to a hardwired address 162 of the block to determine the block within the sector that the data should be written (shown as a Block Write Enable signal). Once the block within the sector has been selected, then the entry address, along with the data to be written, is coupled to the block of the sector and the write data operation occurs. In this way, data can be written to particular memory blocks within the forwarding table memory.

Figure 12:
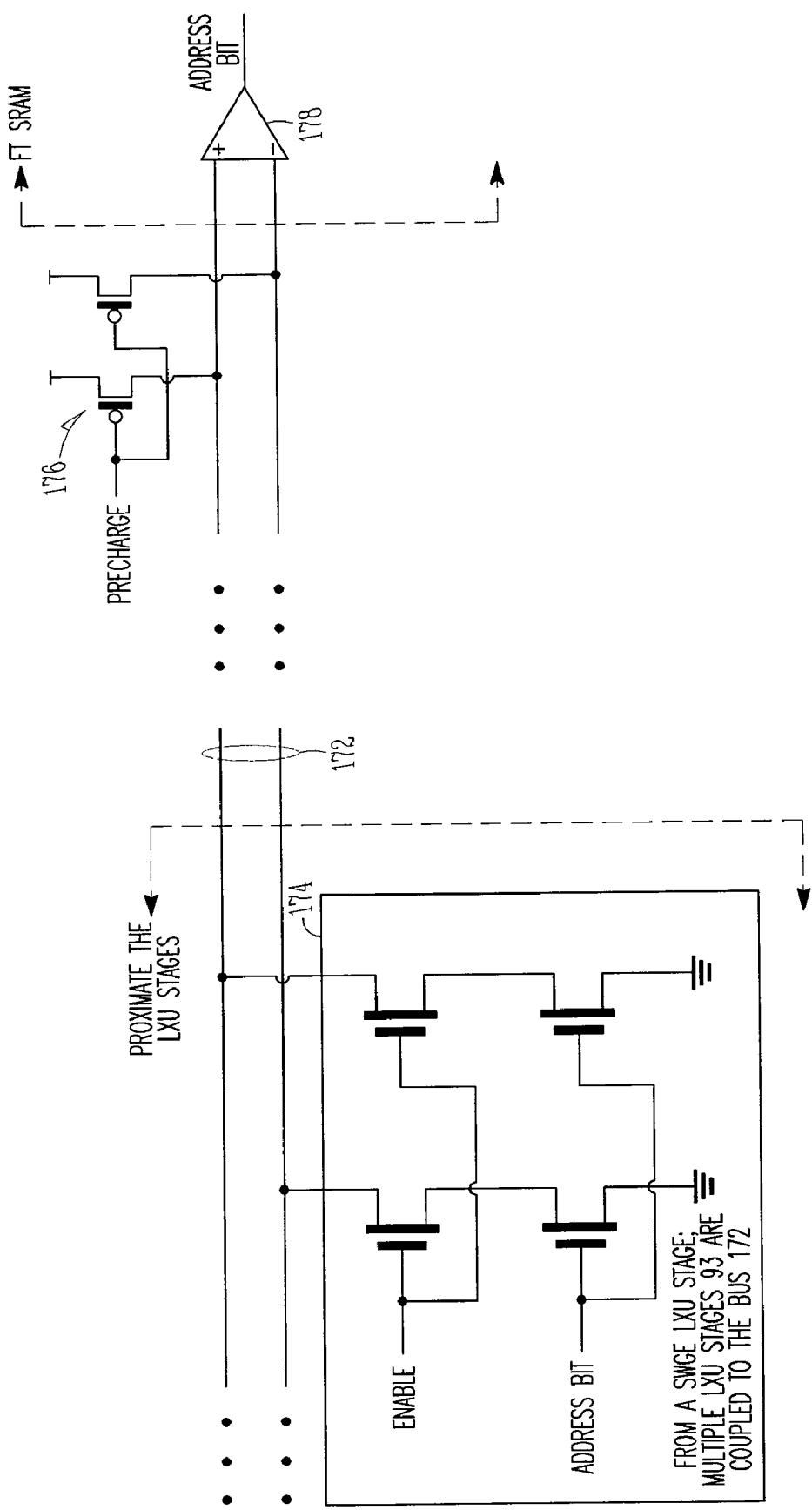
FIG. 12 illustrates a shared differential bus for coupling stages of lookup execution unit to the forwarding table memory, in accordance with an embodiment of the present invention.

In FIG. 12 and in accordance with one embodiment of the present invention, an address bus 170 (or 102) for a forwarding table may be formed using a plurality of differential pairs 172 of wires and tristate drivers 174. The bus may be shared, that is, multiple LXU stages 93 may be coupled to the bus and at any given clock cycle, a single LXU stage drives the bus.

One example of a tristate driver 174 and pre-charge elements 176 is shown in FIG. 12, coupled with a differential pair received by a sense amplifier 178 located in the sector of the memory. This represents the circuit for a single address bit. A differential sense amplifier 178 is provided and on its positive and negative inputs, a pre-charge signal is controllably coupled to the supply line through a pair of CMOS switches. The pre-charge portion of the circuit biases the differential amplifier 178 such that a smaller signal level can be utilized for the differential sense amplifier to detect a change in the input. In this example, the inputs are shown as an "Enable" signal and an "Address" signal coupled to the inputs of the differential sense amplifier through a tristate driver configuration. In the manner, the circuit of FIG. 12 provides an effective differential low swing bus that can be driven and shared over long wire or lead distances, for instance, between the stages of the LXU and the sectors of the forwarding table memory.

Figure 13:
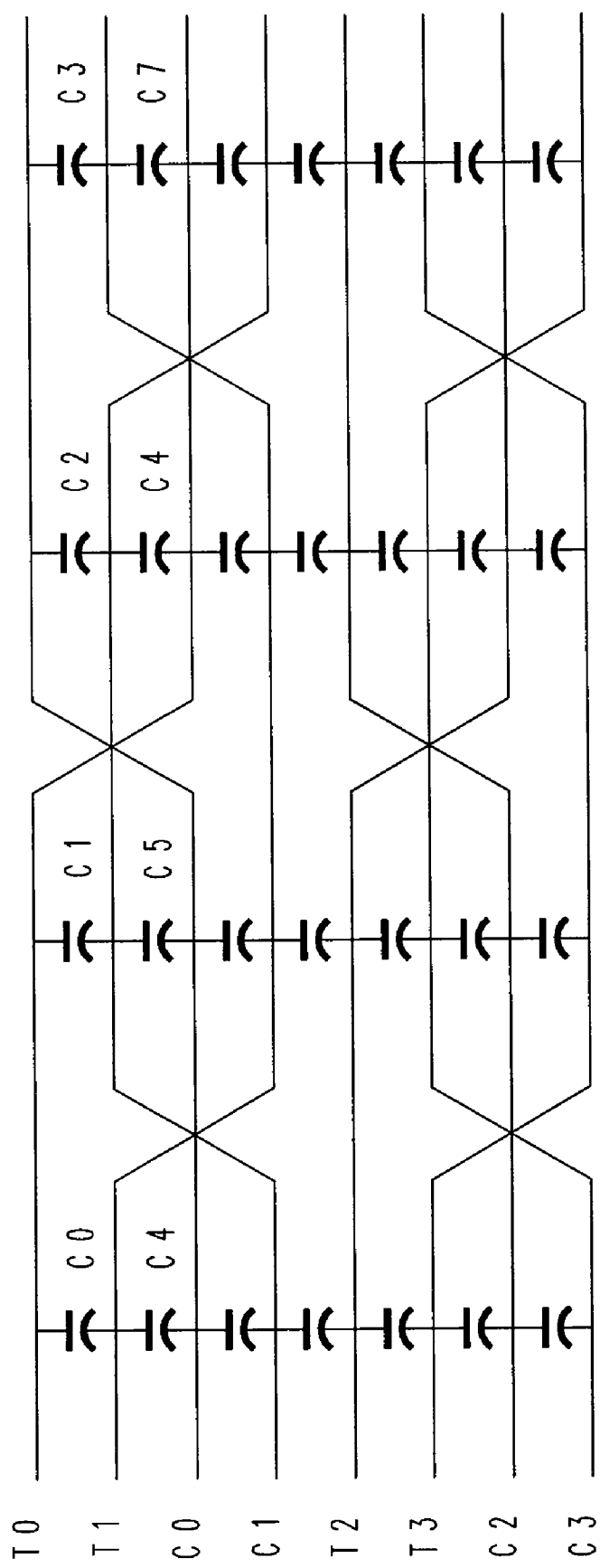
FIG. 13 illustrates an interleaving and distributing differential signal lines, in accordance with an embodiment of the present invention.

Further, the wires of differential pairs may be interleaved as shown in FIG. 13, in one example. In FIG. 13, the differential signal lines true and complement T0, C0 are interleaved with the differential signal lines T1, C1, which are interleaved with the differential signal lines T2, C2, which are interleaved with the differential signal lines T3, and C3, in one embodiment. Further, the differential signal lines may be twisted along various places (i.e., in three different places along the signal lines) or may be twisted throughout, to compensate for capacitive coupling that may occur. In this manner, a robust cross-bar circuit is provided as described with reference to the various embodiments herein.

Forwarding Engine and FT Memory

Figure 14:
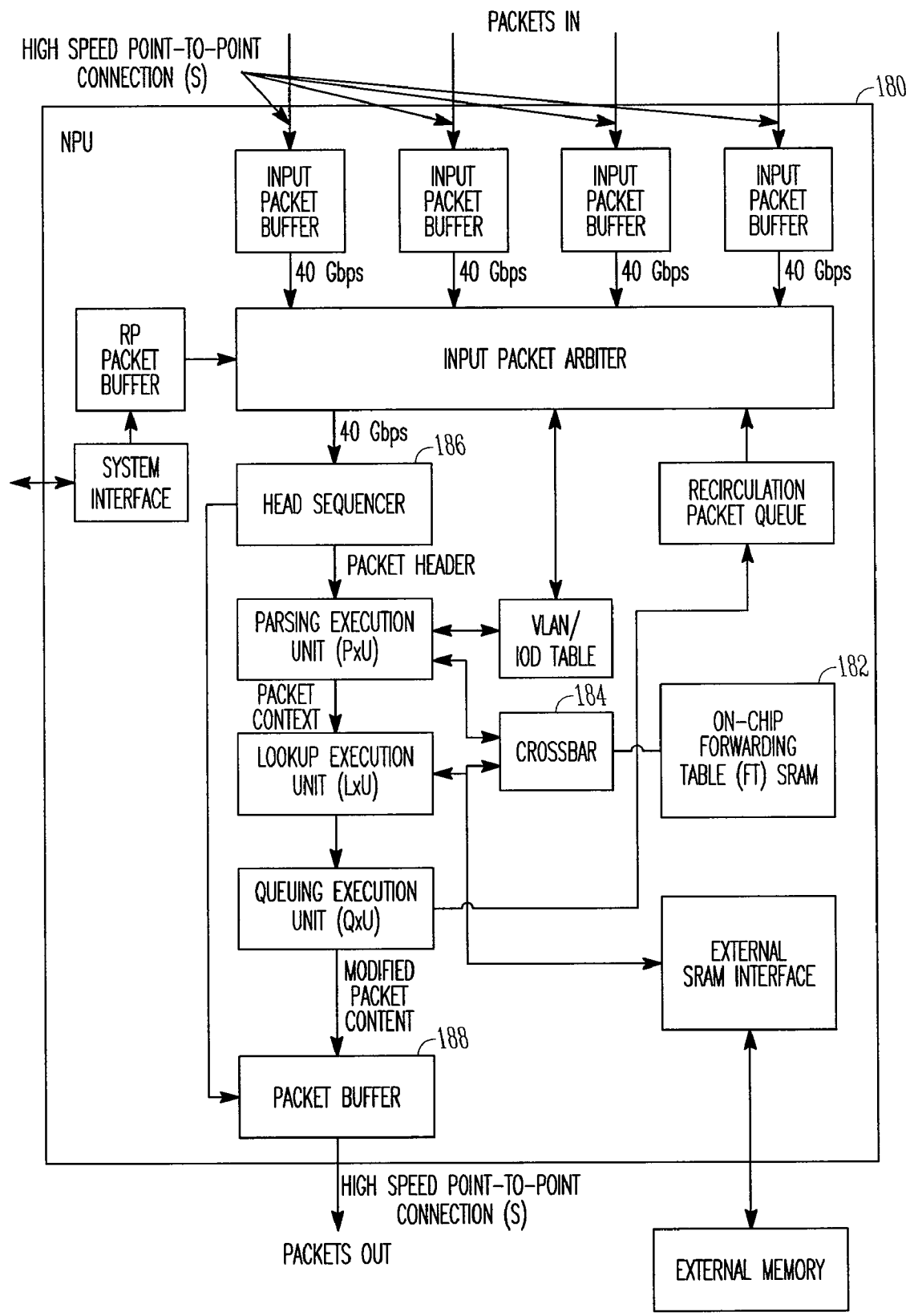
FIG. 14 illustrates a block diagram of a forwarding engine or network processing unit (NPU) having an on-chip Forwarding Table (FT) memory, in accordance with one embodiment of the present invention.

In accordance with one embodiment of the present invention, a forwarding engine 180, such as shown in FIG. 14, performs a lookup operation in part by accessing the route information contained in the on-chip forwarding table 182. In order to reduce the number of cycles needed to performing a look-up operation, the forwarding table memory may include a portion on-chip with the forwarding engine and an external portion outside of the forwarding engine.

The forwarding engine 180 may be, in one example, a network processing unit (NPU) for determining the destination of a packet, the NPU employing a systolic array pipeline architecture. As used herein, the term "network processing unit" includes any processor, microprocessor, or other integrated circuit (or collections thereof)—such as a forwarding engine—which determines the destination of a packet. As will be described herein in greater detail, the NPU of one embodiment of the present invention may employ one or more systolic arrays in various execution units of the NPU to perform various operations on a packet as the packet passes through the NPU. As used herein, the term "systolic array" or "systolic array pipeline" includes, but is not limited to, a series or collection of stages wherein each stage may contain a register file and one or more functional units. In one embodiment, the data or program context being processed by the stages—which may include items such as the state of the register files, the program counter, and/or the current state of the program—flows from a stage to a next stage. In one example, the stages of a systolic array are arranged in a generally linear or sequential order, wherein each stage is capable of performing an operation involved in processing a packet, and the data/program context processed in each stage is processed therein for one clock cycle after which the data/program context is passed to a next stage for processing therein. An example of an NPU and router is disclosed in co-pending, commonly assigned application Ser. No. 10/177,496 entitled "Packet Routing and Switching Device" filed Jun. 20, 2002, the disclosure of which is incorporated herein by reference in its entirety.

In one embodiment, some of the stages of the systolic array are programmable to perform a processing operation involved in processing the packet under program control, while other stages of the systolic array can perform a delay operation (as with "sleep stages," discussed below) where the data passes through a stage with no processing therein. In general, on every clock cycle of the NPU, data/program context is moved from one stage of the systolic array to the next stage in the systolic array, without blocking the intake of new packets or the processing of existing packets. As will be described below, the systolic array of the NPU can receive new packets at a line rate of, for example, 40 Gbits/second, and can finish processing a packet at the line rate during steady state operation. The NPU is adapted for use in a router, where the router has multiple bi-directional ports for receiving and transmitting data into and out of the router, wherein each port is connected with different portions of the network. As mentioned above in one embodiment, when the NPU receives a packet, the NPU operates to determine to which destination port of the router the packet should be sent out so that the packet gets closer to its final destination (i.e., the next hop in the network).

Referring to FIG. 14, a block diagram of a network processing unit 180 is shown in accordance with one embodiment of the present invention. The NPU is implemented using a plurality of execution units, including in one example a parsing execution unit (PXU) for forming a packet context which contains the destination address of the packet and other data descriptive of the packet; a lookup execution unit (LXU) for determining, based on routing data for the network, the destination port of the router (also referred to herein as the output port) to which the packet should be routed; and a queuing execution unit (QXU) for queuing the packet to the proper output queue (maintained outside of the NPU) corresponding to the output port of the router to which the packet should be sent. In one embodiment, each execution unit is implemented using one or more programmable stages of a systolic array, wherein the operations of the execution units are under dynamic program control. The LXU accesses, through a dynamically configurable crossbar 184, an on-chip memory containing the forwarding table (FT)/route information for the network.

In one example, when a packet is received by the NPU, the header sequencer 186 of FIG. 14 extracts the packet header from the packet and passes the packet header to the PXU. The PXU forms a packet context which is a collection of information relating to and describing the packet that corresponds to the context. The packet context includes data such as the destination address specified in the packet header, and is derived from the packet header and other information in the packet or about the packet. After the packet context has been formed in the PXU, the packet context is passed to the LXU and QXU which perform their operations on the packet context. As the packet context is passed through the LXU and QXU and processed therein, portions of the packet context are modified so as to reflect the results of the operation performed by the LXU and QXU.

The header sequencer 186 also passes the packet (in one example, the entire packet) to a packet buffer 188 where the packet is stored. As the LXU and QXU perform their operations using the packet context and as they modify the packet context, the packet remains in the packet buffer 188 until the QXU completes its operations. Generally, after the LXU has determined the destination port to which the packet should be sent and the QXU has modified the packet context to specify the destination port and the queue to which to send the packet, unification logic merges the packet context with the respective packet stored in the packet buffer. In one example, both the packet context and the packet are passed out of the NPU to other portions within the router where the switching functions of the router are performed and the packet is transmitted out of the router to the appropriate output port, using the appropriate data formatting and encapsulation associated with the appropriate output port.

Referring again to FIG. 14, the parsing execution unit (PXU) processes a packet by programmatically extracting information from the packet such as the source address, the destination address, the source port number, the destination port number, the packet type, quality of service (QOS) data, and other data which is needed by the LXU and QXU to perform their operations. It is understood that since the PXU is under program control, the data extracted by the PXU to form the packet context is a matter of choice depending on the particular implementation chosen and how the software is written to process packets. The PXU stores this extracted information into a register file which is accessible throughout the processor, and passes the context of the packet to the LXU for processing therein.

Using the context of the packet, the LXU performs the necessary table lookup for forwarding the packet to the proper output port of the router, as well as to perform any quality of service (QOS) or filtering functionality. It is understood that since the LXU is under program control, the operations performed by the LXU to determine the proper output port to which to send the packet, or to perform other functions within the LXU, are a matter of choice depending on the particular implementation chosen and how the software is written to process packets.

As will be described below with reference to FIGS. 15-16, in one embodiment, the LXU is formed using one or more stages of a systolic array 190 which can be represented, having 12 major stages, with each major stage having 8 active minor stages and 10 inactive (sleep) minor stages therein. In accordance with embodiments of the present invention, the packet's context is passed, on every cycle of the NPU, from one minor stage to the next minor stage in the systolic array.

After determining the destination queue/port in the router to which to send the packet, the LXU attaches the forwarding information to the context for the packet, and passes the context of the packet to the QXU. Using the context, the QXU removes the corresponding packet from the packet buffer and passes the packet and the context to a portion of the router for writing to the appropriate output queue in the router so that the packet can be transmitted out of the router on the appropriate output port.

In the example of FIG. 14, the NPU has a set of input packet buffers (IPBs), wherein each IPB is coupled with a media adapter. Each input packet buffer is coupled with an input packet arbiter (IPA), which, in general, arbitrates between the input packet buffers to select packets to forward into the header sequencer of the NPU for processing by the PXU, LXU, and QXU. The input packet buffers are FIFO buffers and accumulate an entire packet from the media adapter before transmitting the packet to an input packet arbiter. Each input packet buffer has a 10 Gbits/sec connection with the media adapter, and a 40 Gbits/sec connection with the input packet arbiter, in one example.

The input packet buffers account for rate mismatches between the media adapters (10 Gbits/sec) and the input packet arbiter (40 Gbits/sec) by aggregating four 10 Gbits/sec packet streams to a 40 Gbits/sec packet stream. The input packet arbiter, being coupled with the input packet buffers and the header sequencer, selects an input packet buffer for obtaining a packet, and passes the packet to the header sequencer. The input packet arbiter cycles between the various input packet buffers to obtain packets therefrom, and in this manner, the input packet arbiter creates a 40 Gbits/sec stream of packet data which is passed to the header sequencer of the NPU.

Further as shown in FIG. 14, the IPA accesses a VLAN/IOD table which provides data relating to the format of the packet, which the PXU uses in forming the packet context. The IPA performs a look-up in an interface ordinal descriptor (IOD) table and adds the appropriate IOD to the packet header before transmission to the header sequencer. The IOD specifies the type of the input port/media adapter upon which the packet was received (i.e., Ethernet). The IOD can be used for controlling metering, for example, and for use by the PXU to determine how to parse the packet, as different packet data formats may require different parsing rules.

In addition, the IPA counts the length of the incoming packet, and then in one example adds the length information to the packet header. In one embodiment, the IOD and the length are prepended to the packet, i.e., added to the beginning of the packet. The IPA also examines a checksum to determine if the packet was transmitted correctly from the media adapter.

The IPA may also receive, from the RP packet buffer, packets originating from RP (these packets are referred to herein as "RP generated packets"). The RP generated packets are encoded to pass through the NPU with minimal processing, and bypass the IOD lookup because the routing protocol software (running in the route processor) adds the correct IOD to the packet before forwarding to the RP packet buffer.

The IOD table is implemented using a static random access memory (SRAM) and stores information about each type of port that the router is servicing, e.g., 1 gigabit Ethernet, 10 gigabit Ethernet, etc. The route processor communicates with the media adapters via a system interface to determine which type of ports are presently configured in the router, and then assembles the IOD table to reflect the ports that are presently configured. Accordingly, the media adapters may be dynamically connected or disconnected to/from the router to support various types of ports, and the router will be able to reconfigure itself to support the new media adapters.

In accordance with one embodiment of the present invention, the destination queue for the packet is assigned by the NPU before the packet is transmitted to the switching engine. Once the packet is provided to the switching engine of the router, in a process known as cellification, the switching engine breaks the packet into a set of cells and stores the cells in the queue specified by the NPU and associated with the proper output port of the router.

As mentioned above, the NPU execution units—the PXU, LXU, and QXU—are implemented using systolic array pipeline architectures, in one embodiment, so that operations (such as the look-up operation and memory reads) can be performed at the line rate, which eliminates the need for input-striping as with conventional routers. The NPU thereby permits the packets to be stored in memory of the router as a function of the router's output port associated with the packet, which thereby permits the orderly and efficient storage and extraction of the packets to and from memory, such as by using round-robin output striping.

As shown in FIG. 14, in one embodiment of the invention, high speed serial links ("point-to-point connections") are used to connect signal lines of the NPU to signal lines of another integrated circuit within the router. In one example, the NPU includes one or more signal lines, a second integrated circuit includes one or more signal lines, and each signal line of the NPU is connected with a signal line of the second integrated circuit to form a high speed interface between the integrated circuits, and these connections are used in place of traditional bus interfaces between integrated circuits.

Figure 15:
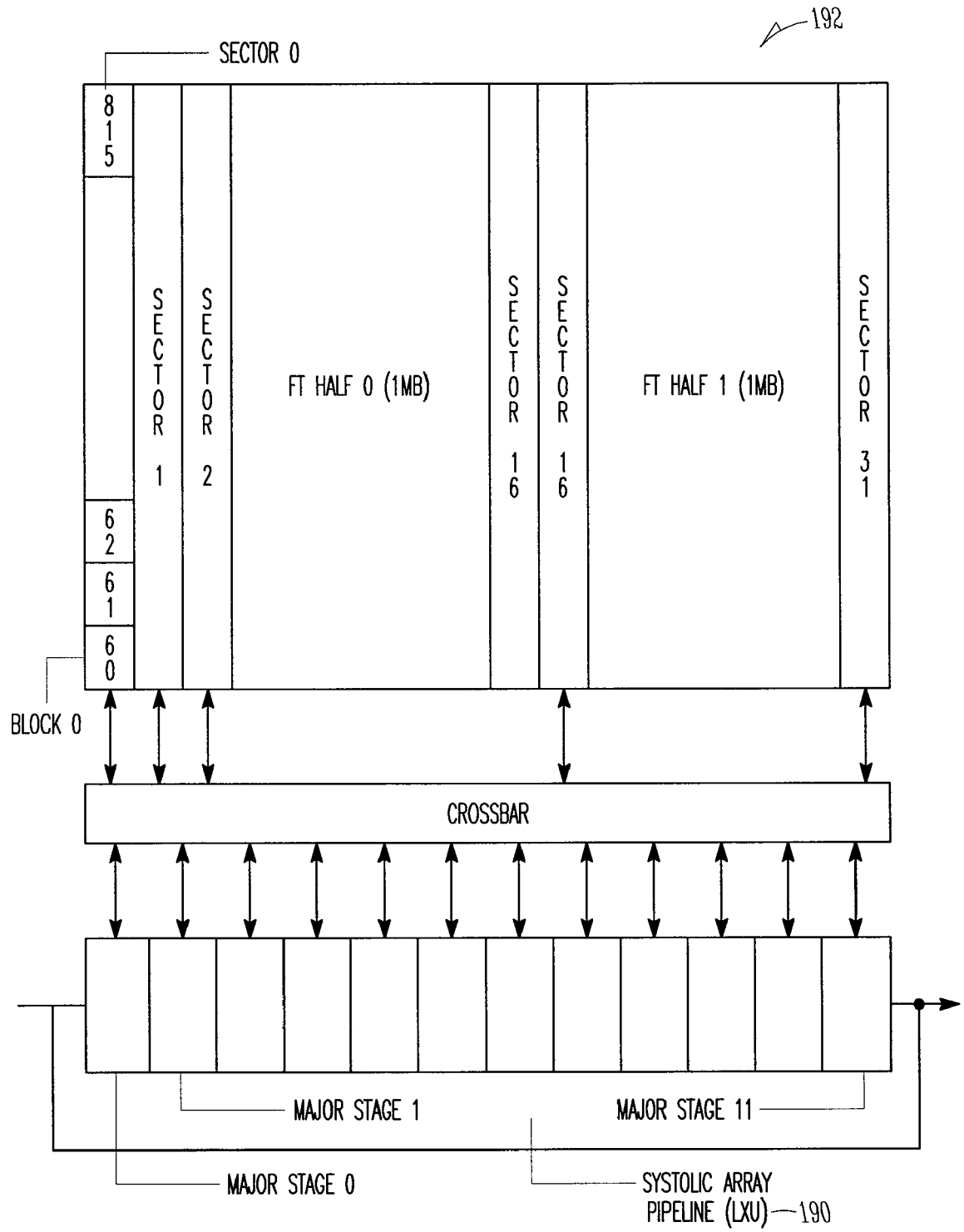
FIG. 15 illustrates a block diagram of a look-up engine, a forwarding table crossbar, and a forwarding table, in accordance with one embodiment of the present invention.

Referring now to FIG. 15, a forwarding table (FT) 192 is a memory array including the IP destination addresses serviced by the router. Generally, each router that is connected with the router has its IP destination address stored in the forwarding table 192. The FT is, in one embodiment, implemented in a 2 MB on-chip SRAM organized as 32 sectors, each sector having sixteen (16) blocks of 4,096 bytes or 1024 32-bit words, with each word adapted to store to a node of the trie as needed. The 2 MB on-chip SRAM is placed on the same chip as the systolic array, which results in less latency between when a memory address in the FT is read and when data from that memory address is returned to the systolic array. Further, an on-chip FT allows multiple concurrent accesses to the FT, thus allowing multiple lookups to proceed in parallel. Prior art forwarding tables are generally located off-chip, which creates a greater latency between forwarding table reads and forwarding table data returns, and also severely limits the available bandwidth.

In one example, each major stage (i.e., major stage 0 to 11 as shown in FIG. 3) of the systolic array 190 uses its own address space. To facilitate the address space requirements of the systolic array, the FT is partitioned into a plurality of sectors defining a plurality of blocks. The amount of memory needed by each stage, however, is dynamic, because the IP destination addresses stored in the FT change as the network topology changes. Accordingly, the sectors and blocks are mapped to each stage by a crossbar, which in one example includes shared differential low swing buses, to facilitate communication between the stages and all of the sectors and blocks.

The FT as illustrated in the example of FIG. 15 is divided into 2 halves, each containing 16 64 KB-sectors. This facilitates a high read bandwidth between the systolic array and the FT. In one embodiment, the FT is implemented as a Double Data Rate SRAM. Each major pipeline stage drives a read address to both halves of the FT, and a mutliplexer connects a first data bus from the first half and a second data bus from the second half to each major stage. In one embodiment, one of the systolic array major stages sends a 20-bit read address to the FT, the 20 bit read address including a bit to select between high and low halves of the FT, a 5-bit sector select, a 4-bit block select, and a 10-bit entry select. The read address maps to a memory segment (i.e., node) of either the high or low half, with the selected half returning a 34-bit data input into the major stage. In FIG. 15, the crossbar may be implemented as two crossbars, one crossbar for each half of the FT.

The 16 FT read ports communicate with sectors using a plurality of shared, differential, low swing buses. Collectively, the buses are called the crossbar, because they connect all sectors to all FT read ports. Read address ports drive onto shared crossbar buses terminating at sectors. Each FT read data port has its own dedicated crossbar bus that is shared by the sectors. The write address and data are transported with a full swing bus.

Each 64 KB sector includes two read ports and one write port, in one example. One FT read address crossbar bus is dedicated to each sector read address port. Within a sector, addresses and data are transported to blocks as full swing signals, and read output data is returned over shared, differential, low swing buses. Each 4 KB block contains 1024 34-bit (includes 2 parity bits) entries, in one example. The 4 KB granularity is a function of the trade-off between the maximum number of blocks that can access the sector's low swing bus and the amount of memory that is unused by blocks using only one of their entries. The blocks are implemented as a standard SRAM block, and can perform one read and one write per cycle. In one example, when a read address and write address select the same block, the read operation first reads out the old data and the write operation writes the new data.

In one embodiment, each FT read port is controlled by 1 major LXU pipeline stage, and each of the 32×2=64 sector read ports is mapped to 1 of the FT's 16 read ports. Within a sector, each block is mapped to one of the sector's two read ports. All sector write ports are connected to the FT write port, and all block write ports are connected to their sector's write port in one example.

Figure 16:
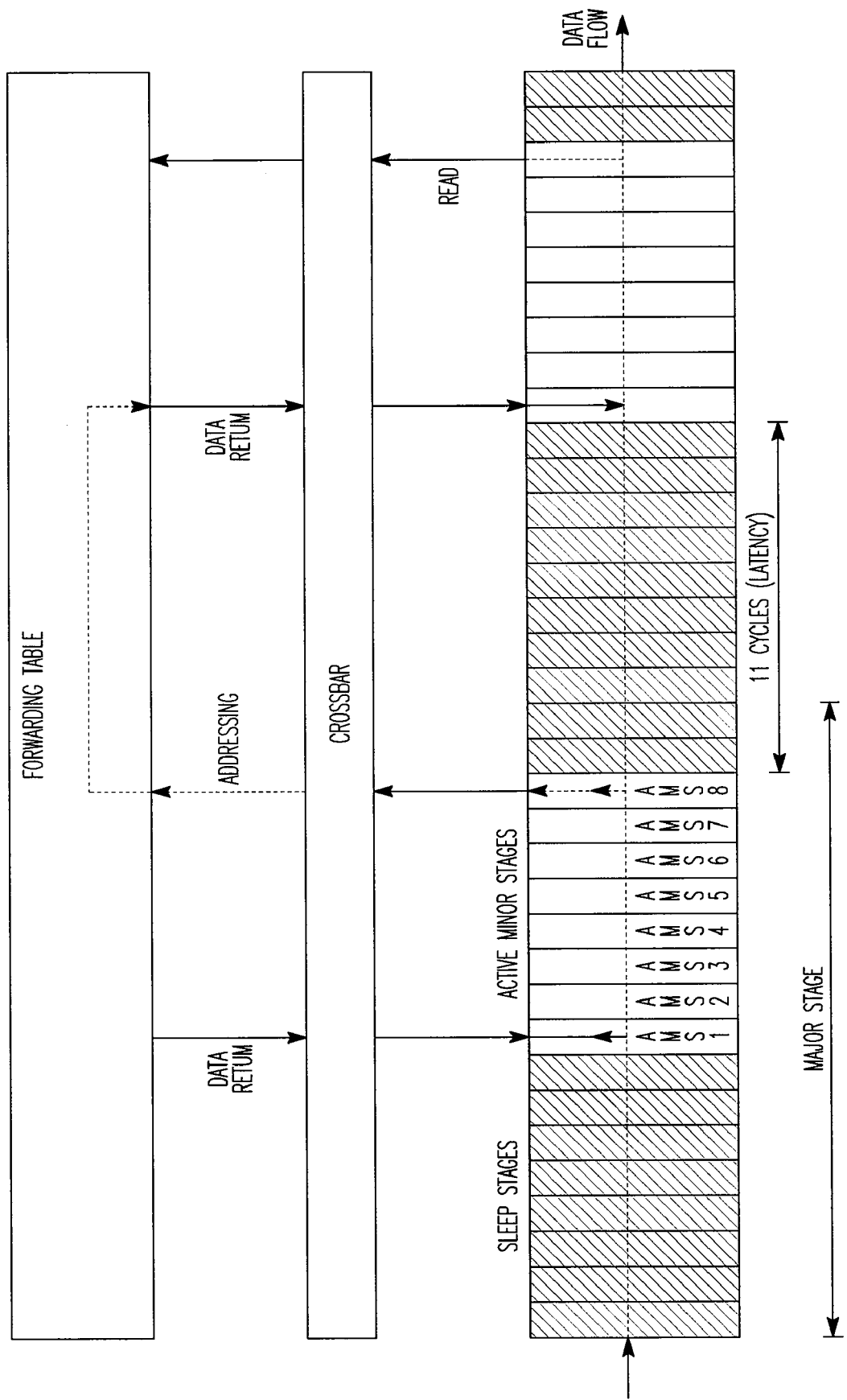
FIG. 16 illustrates an embodiment of the look-up engine and the communication paths between the look-up engine and the forwarding table, in accordance with one embodiment of the present invention.

As illustrated in FIG. 16, the FT read and data return operations have a 11 cycle latency with 2-cycle latency for transmission of the FT read address, 7-cycle latency for the reading of the FT, and a 2-cycle latency for the data return. Accordingly, there are 11 cycles, corresponding to the 3 sleep stages at the end of the preceding stage and 8 cycles at the beginning of the succeeding stage, between when the first major stage makes a read request and the data is returned to the following major stage.

In one embodiment, the FT communicates with systolic array through the crossbar, which connects all FT read ports to sector read ports. The FT has an address crossbar and a data crossbar. A high-speed bus may be used to communicate between the systolic array and FT, and in one example, the buses are mixed. A sector port may be assigned to one unique stage, but a single stage can have multiple sector ports assigned to it. In one example, the FT delivers 34 bits of data to each pipeline stage every cycle at 375 Mhz. In one embodiment, the crossbar is implemented as a tristate, differential, low swing bus. Alternatively, the crossbar can be implemented using static combinational logic.

In one embodiment, particular stages of the systolic array are adapted to launch memory accesses to the forwarding table SRAM so that the results from the memory access will be available to stages downstream in the systolic array. These stages which may be dedicated to memory accesses can be spaced throughout the systolic array so that the intermediate stages can perform other operations while the memory access is in flight. The different stages may access the forwarding table SRAM through multiple ports to the FT SRAM.

Figure 17:
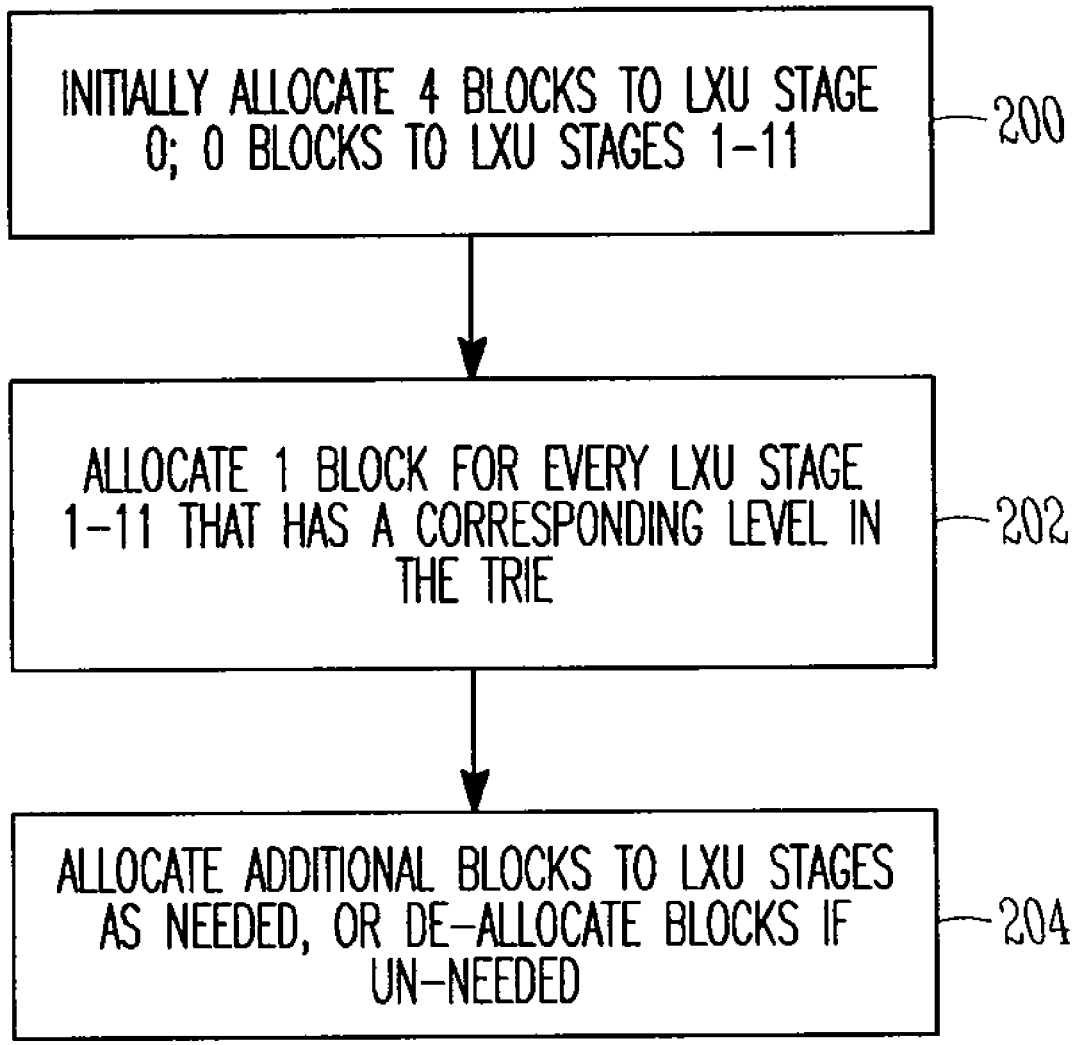
FIG. 17 illustrates an example of logical operations for allocating memory blocks to stages of the LXU, in accordance with one embodiment of the present invention.

FIG. 17 illustrates one example of logical operations for allocating memory of the FT to the stages of the LXU which may be done dynamically or under program control. In one embodiment, blocks of the FT are incrementally and dynamically allocated to each stage of the systolic array on an as needed basis, and when a stage no longer needs block of the FT, the block becomes free to be re-allocated. At operation 200, an initial memory allocation occurs. In one example, LXU stage 0 is allocated 4 blocks of memory so that LXU stage 0 can have sufficient memory to perform the root node processing between, in this example, 4096 nodes. In one example, LXU stages 1-11 are initially allocated 0 blocks.

At operation 202, for LXU stages 1-11, one block of memory is allocated dynamically to each of the LXU stages 1-11 that has a corresponding level in the trie for processing. For instance, for a radix trie that whose nodes span 8 levels deep (root node plus 7 additional levels), LXU stages 1-7 would each be allocated 1 block of memory in this example. Each block of memory permits the stage to compare against 1,024 nodes. If a particular level in the trie has more than 1,024 nodes, then the corresponding LXU stage may be allocated one or more additional blocks of memory. At operation 204, if the trie changes such as due to changes in the network topology such that a level of the trie has fewer nodes, then the corresponding LXU stage may have one or more blocks of memory de-allocated.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to various embodiments thereof, it will be understood by those skilled in the art that various other changes in the form and details may be made without departing from the spirit and scope of the invention.

What is claimed is:

1. An apparatus to forward network packets, the apparatus comprising:
    a lookup execution unit including a plurality of stages;
    a forwarding table memory arranged in a hierarchy including addressable sectors, blocks, and entries; and
    a crossbar having an address crossbar for selectively coupling one of the plurality of stages to a sector of the forwarding table memory to enable data to be read from the sector, the stages operatively including one or more inactive clock cycles between an address request to the forwarding table memory and a read return from the forwarding table memory, and the stages being arranged in a sequential configuration so that a first stage passes data corresponding to a network packet to a second stage for processing and each inactive clock cycle corresponds to an inactive stage that passes the data corresponding to the network packet to a next stahe without accessin the forwarding table memory.

2. The apparatus of claim 1, wherein the address crossbar is dynamically controllable to selectively couple stages of the lookup execution unit to different sectors of the forwarding table memory.

3. The apparatus of claim 1, wherein the address crossbar is formed from a plurality of differential signal pairs.

4. The apparatus of claim 1, wherein any one of the plurality of stages of the lookup execution unit is selectable to be coupled with any one of the sectors of the forwarding table memory.

5. The apparatus of claim 1, wherein the forwarding table memory comprises an on-chip memory portion and an off-chip memory portion.

6. The apparatus of claim 5, wherein the on-chip memory portion is located on a similar chip as the lookup execution unit.

7. The apparatus of claim 5, wherein the off-chip memory is located on a different chip from the lookup execution unit.

8. The apparatus of claim 1, wherein the stages are configured as a systolic array of elements that operate sequentially over clock cycles of the apparatus on the network packets, and the address crossbar selectively couples one of the systolic-array elements to the forwarding table memory to enable data to be read from the sector.

9. The apparatus of claim 1, wherein said one of the plurality of stages is selectively coupled to the sector of the forwarding table memory after the data corresponding to the network packet reaches said one of the plurality of stages.

10. An apparatus to forward network packets, the apparatus comprising:
    an execution unit including a plurality of stages; and
    a crossbar coupled to the execution unit, the crossbar configured to include:
        a set of address lines coupled with each stage of said plurality of stages for receiving an address signal from at least one stage; and
        logic for selectively coupling one of the plurality of stages to at least a portion of a forwarding memory, the logic configured to receive the set of address lines from each stage, the stages operatively including one or more inactive clock cycles between an address request to the forwarding memory and a read return from the forwarding memory, and the stages being arranged in a sequential configuration so that a first stage passes data corms to a, network packet to a second stage for processing and each inactive clock cycle corresponds to an inactive stage that passes the data corresponding to the network packet to a next stage without accessing the forwarding memory wherein the forwarding memory.

11. The apparatus of claim 10, wherein
the forwarding memory includes an on-chip memory portion and an off-chip memory portion, and
the execution unit and the on-chip memory portion of the forwarding memory are on a same chip.

12. The apparatus of claim 10, wherein
the forwarding memory includes an on-chip memory portion and an off-chip memory portion, and
the crossbar is further configured to include logic to compare a portion of the address signal to one or more hardwired addresses associated with each of the on-chip memory portion and off-chip memory portion.

13. The apparatus of claim 12, wherein the crossbar is further configured to include logic to receive a plurality of programmable enable signals corresponding to each stage of the plurality of stages.

14. The apparatus of claim 13, wherein the forwarding memory comprises addressable sectors, and wherein any one of the plurality of stages of the execution unit is selectable to be coupled with any one of the sectors of the forwarding memory.

15. A method comprising:
receiving a network packet into an execution unit of a forwarding engine in a router, wherein the execution unit includes a plurality of stages;
selectively coupling, using an address crossbar, at least one of the plurality of stages to a sector of a memory, wherein the memory is arranged in a hierarchy including addressable sectors, blocks, and entries;
determining, using said at least one of the plurality of stages, a destination for the network packet based on routing information in the sector of memory, wherein the stages operatively include one or more inactive clock cycles between an address request to the sector of memory and a read return from the sector of memory, the stages being arranged in a sequential configuration so that a first stage passes data corresponding to the network packet to a second stage for processing and each inactive clock cycle corresponds to an inactive stage that passes the data corresponding to the network packet to a next stage without accessing the sector of memory; and
forwarding the network packet to its destination.

16. The method of claim 15, wherein forwarding the network packet to its destination includes forwarding the network packet to a destination port of the router.

17. The method of claim 15, wherein forwarding the network packet to its destination includes queuing the network packet in a third execution unit to queue the packet in an output queue maintained outside of the forwarding engine.

18. The method of claim 15, wherein receiving a network packet into the execution unit of a forwarding engine includes parsing the network packet with a second execution unit to form a packet context containing the destination address of the network packet.

19. The method of claim 15, wherein the memory includes an on-chip portion and an off-chip portion.

20. The method of claim 15, wherein the stages are configured as a systolic array of elements that operate sequentially over clock cycles of the forwarding engine on the network packet, and the address crossbar selectively couples one of the systolic-array elements to the sector of memory to enable data to be read from the sector of memory.

21. An apparatus to forward network packets, the apparatus comprising:
a lookup execution unit including a plurality of stages;
a forwarding table memory arranged in a hierarchy including addressable sectors, Hocks, and entries; and
a crossbar haying an address crossbar for selectively coupling one of the plurality of stages to a sector of the forwarding table memory to enable data to be read from the sector and a data crossbar for selectively coupling another one of the plurality of stages to the sector to read data from the sector,
the stages being arranged in a sequential configuration so that a network packet is processed sequentially by the stages to access the forwarding table memory,
a data-requesting stage being selectively coupled by the address crossbar to the forwarding table memory to request data from the forwarding table memory, and
a data-receiving stage being selectively coupled by the data crossbar to the forwarding table memory to receive data from the forwarding table memory in response to a request from the data-requesting stage.

22. The apparatus of claim 21, wherein the stages are configured as a systolic array of elements that operate sequentially over clock cycles of the lookup execution unit on the network packet.

23. The apparatus of claim 21, wherein the stages operatively include one or more inactive clock cycles between the data-requesting stage and the data-receiving stage.

* * * * *

UNITED STATES PATENT AND TRADEMARK OFFICE
CERTIFICATE OF CORRECTION

| | | |
|---|---|---|
| PATENT NO. | : 8,270,399 B2 | Page 1 of 1 |
| APPLICATION NO. | : 12/260841 | |
| DATED | : September 18, 2012 | |
| INVENTOR(S) | : Holst et al. | |

It is certified that error appears in the above-identified patent and that said Letters Patent is hereby corrected as shown below:

In the Claims

In column 16, line 18, in Claim 1, delete "stahe" and insert --stage--, therefor In column 16, line 18, in Claim 1, delete "accessin" and insert --accessing--, therefor In column 16, line 64, in Claim 10, delete "corms" and insert --corresponding--, therefor In column 16, line 64, in Claim 10, delete "a," and insert --a--, therefor In column 17, line 1-2, in Claim 10, after "accessing the forwarding memory", delete "wherein the forwarding memory", therefor In column 18, line 22, in Claim 21, delete "Hocks," and insert --blocks,--, therefor In column 18, line 23, in Claim 21, delete "haying" and insert --having--, therefor Signed and Sealed this
Third Day of June, 2014

Michelle K. Lee
*Deputy Director of the United States Patent and Trademark Office*